US006831624B1

(12) United States Patent
Harrold

(10) Patent No.: US 6,831,624 B1
(45) Date of Patent: Dec. 14, 2004

(54) TIME SEQUENTIALLY SCANNED DISPLAY

(75) Inventor: Jonathan Harrold, Oxford (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/483,420

(22) Filed: Jan. 14, 2000

(30) Foreign Application Priority Data

Jan. 15, 1999 (GB) .............................. 9900839

(51) Int. Cl.⁷ ................................ G09G 3/36
(52) U.S. Cl. ..................... 345/98; 345/345; 345/90; 348/523; 348/524
(58) Field of Search .................. 345/87–90, 98–100, 345/102, 205, 206, 521, 690; 348/503, 521, 523, 524

(56) References Cited

U.S. PATENT DOCUMENTS

| 5,225,823 | A | | 7/1993 | Kanaly ................ 340/793 |
| 5,339,090 | A | * | 8/1994 | Crossland et al. ........ 345/90 |
| 5,471,225 | A | | 11/1995 | Parks ................ 345/98 |
| 5,566,010 | A | * | 10/1996 | Ishii et al. ............. 345/58 |
| 5,798,746 | A | * | 8/1998 | Koyama ............. 345/89 |
| 5,920,298 | A | * | 7/1999 | McKnight ........... 345/100 |
| 5,977,942 | A | * | 11/1999 | Walker et al. ......... 345/102 |
| 6,097,352 | A | * | 8/2000 | Zavracky et al. ......... 345/7 |
| 6,144,374 | A | * | 11/2000 | Hyun .............. 345/204 |
| 6,225,991 | B1 | * | 5/2001 | McKnight ........... 345/205 |
| 6,239,780 | B1 | * | 5/2001 | Walker et al. ......... 345/102 |
| 6,295,054 | B1 | * | 9/2001 | McKnight ........... 345/205 |
| 6,369,832 | B1 | * | 4/2002 | McKnight ........... 345/589 |
| 6,421,037 | B1 | * | 7/2002 | Chen ............... 345/92 |

FOREIGN PATENT DOCUMENTS

| EP | 0 656 555 | 11/1994 |
| EP | 0 726 482 | 1/1996 |
| EP | 0 833 183 | 9/1997 |
| GB | 2 297 876 | 2/1995 |
| GB | 2 317 710 | 9/1996 |
| GB | 2 343 980 | 11/1998 |

OTHER PUBLICATIONS

Search Report, Application No. GB 9900839.3, dated Apr. 19, 1999.

* cited by examiner

Primary Examiner—Henry N. Tran
(74) Attorney, Agent, or Firm—Renner, Otto, Boisselle & Sklar, LLP

(57) ABSTRACT

A time sequentially scanned display comprises a matrix 20 of picture elements 21. Each of the picture elements comprises a display element 9, for instance of liquid crystal type. An addressable latch 3 has a plurality of storage locations which may be selectively updated in response to an address supplied to an address input. A multiplexer 7 supplies image data from any one of the storage locations at a time to the display element 9. The multiplexer has an address input for selecting which of the storage locations of the latch 3 supplies image data to the display element 9. In some of the embodiments, the address inputs are connected together and addressed by the outputs of a single counter 11 whereas, in other embodiments, the address inputs of the latch 3 and the multiplexer 7 are addressed independently, for instance by two counters 11a and 11b. Such an arrangement permits various types of asynchronous operation between addressing and displaying data.

45 Claims, 31 Drawing Sheets

TIME SEQUENTIALLY SCANNED DISPLAY

BACKGROUND OF THE INVENTION

1. Field of the Invention

The present invention relates to a time sequentially scanned display, for instance of liquid crystal type. Such displays may, for example, be used for time sequential colour displays, three-dimensional workstations, scientific visualisation, video games, videophones and three-dimensional television.

2. Description of the Related Art

In a known type of colour sequential display, the red, green and blue fields making up a complete colour frame are displayed one after the other sufficiently rapidly for an observer to perceive a colour image without substantial visible flicker. It is common for the image data to be supplied as a serial video signal with the individual colour data being supplied simultaneously in parallel. In order for this to be converted to the time sequential format for display, field or frame stores for storing complete fields or frames of image data must be provided.

Such stores may be provided externally of the display device itself. However, U.S. Pat. No. 5,225,823 discloses an arrangement in which such storage is integrated with the display device. Each picture element (pixel) of the display contains two stores (known as "ping-pong" memories) for pixel image data. While one of these stores is being used to control the visual state of the pixel, pixel image data for the next frame may be written into the other store. However, the individual red, green and blue fields are not independently addressable and such an arrangement is only capable of a single first type of operation.

The "first type of operation" of a display is one in which there is a one-to-one correspondence between data addressing phases and data display phases. Thus, every data value addressed to a pixel is displayed once and only once. An example of this is disclosed in British Patent Application No. 9825152.3.

SUMMARY OF THE INVENTION

According to a first aspect of the invention, there is provided a time sequentially scanned display comprising a matrix of picture elements, each of which comprises a display element, an addressable latch having a plurality of storage locations and a first address input for selecting any one of the storage locations for storing image data, and a multiplexer for supplying image data from any one of the storage locations at a time to the display element, the multiplexer having a second address input for selecting which of the storage locations supplies image data to the display element.

Each of the picture elements may comprise an addressing arrangement for supplying addresses to the first and second address inputs.

Each of the addressing arrangements may comprise a counter whose output is connected to the first and second addressing inputs so that the storage locations are selected for storing image data in a first predetermined sequence and for supplying image data to the display element in a second predetermined sequence which is identical to but one step out of phase with the first predetermined sequence. The counter may have a clock input connected to the output of a transfer signal detector whose input is connected to a scan or data electrode of the matrix. The counter may be a modulo counter having a modulo control input provided with a latching arrangement.

Each of the addressing arrangements may comprise first and second counters whose outputs are connected to the first and second address inputs, respectively. The first counter may have a clock input connected to a scan electrode of the matrix. The second counter may have a clock input connected to the output of a transfer signal detector whose input is connected to a or the scan electrode or a data electrode of the matrix.

The addressing arrangement may comprise a reset arrangement for resetting the first and second counters when power is applied to the display.

The first and second counters may be modulo counters having modulo control inputs provided with a latching arrangement.

The latching arrangement may have data inputs connected to at least some outputs of the storage locations. The latching arrangement may be arranged to be enabled by an output of a decoder. The decoder may comprise a counter having a clock input connected to the output of the transfer signal detector and a reset input connected to a or the scan electrode.

Each addressable latch may comprise an analog addressable latch.

Each addressable latch may comprise a latch having the plurality of storage locations and a demultiplexer for selectively supplying the image data to any one of the storage locations.

Each addressable latch may have a clock input connected to a or the scan electrode and a data input connected to a or the data electrode.

Each addressable latch may have storage locations for red, green and blue image data.

Each addressable latch may have storage locations for red, green, blue and intensity image data.

Each addressable latch may have storage locations for red, green and blue image data for two image fields or frames.

Each addressable latch may have storage locations for red, green, blue, white and/or black image data. The storage locations for the white and/or black image data may be hard-wired to receive voltage levels which are not addressable.

The display may comprise a multi-colour backlight and a backlight controller.

Each display element may comprise a liquid crystal picture element. Each display element may be of reflective type. The addressable latches and the multiplexers may be embodied as crystalline silicon or poly-silicon. The addressable latches and the multiplexers may be disposed behind the reflective display elements.

According to a second aspect of the invention, there is provided a method of operating a display according to the first aspect of the invention, comprising supplying image data to the picture elements in first sets of time-sequential addressing phases with each first set constituting a frame of image data and displaying the image data in second sets of time-sequential display phases with each second set constituting a frame of image data, the number of display phases in each of the second sets being greater than the number of addressing phases in each of the first sets. The addressing phases of each of the first sets may comprise different component colour addressing phases, the display phases of each of the second sets may comprise component colour display phases, and at least one of the component colour display phases may be repeated in each of the second sets. A green phase may be repeated in each of the second sets.

The number of display phases in each of the second sets may be an integer multiple of the number of addressing phases in each of the first sets. All of the colour component display phases may be repeated the same number of times in each of the second sets.

White and/or black addressing phases may occur in only some of the first sets.

The maximum electro-optic response time of the liquid crystal picture elements may be substantially equal to or less than the duration of each of the display phases.

The image data supplied during at least some of the addressing phases may comprise or contain control data for controlling an aspect of pixel operation. The aspect of pixel operation may comprise the modulo of each modulo counter.

It is thus possible to provide a display which can be operated in other than the first type of operation referred to hereinbefore. In particular, such a display is capable of a second type of operation (as well as being capable of the first type of operation). According to the second type of operation, the number of data display phases is an integral number greater than the number of data addressing phases. Thus, an addressed or stored value may be displayed during more than one time slot, between which different data may be displayed. In other words, the data addressing phase and the data display phase of the display need not be in a one-to-one relationship, as is necessary in known types of time sequentially scanned displays. For example, data addressing may be performed at a refresh rate of 30 Hz whereas the data display refreshing may be performed at 60 Hz so as to reduce the visibility of image flicker as compared with the first type operation. In fact, the addressing rate of the display may be substantially reduced without compromising the display flicker performance. This may reduce radio frequency emissions generated by the display. Also, a reduced input data rate allows the design of display scanning electronics to be simplified, particularly for integrated poly-silicon drivers.

Lower addressing rates may result in reduced power consumption. The second type of operation may permit reduced power reversionary modes of operation. For example, it is possible to operate such a display in an intensity (Y) only reversionary power saving mode, which may be useful in portable products to prolong operation when battery charge is low. Also, different parts of a display may operate in different modes offering further opportunities for saving power during normal operation.

A display of this type is capable of operating in different modes depending on the requirements of the specific application. Further, individual parts such as lines, groups of lines, pixels or groups of pixels, may operate in different modes so as to provide a very versatile display. Examples of such modes include repeating one or more of the fields in any display cycle, for instance to provide RGGB or RGBG display from RGB data. The display addressing cycles may load different data in sub-views, such as $RG_1BG_2$ so that the G1 and G2 fields (which may contain different data) are integrated by the eye to obtain a greyscale value. A field may not be addressed but nethertheless may be displayed, for example to implement a black (K) blanking phase. Each frame may include a luminence or intensity (Y) phase to maximise brightness.

As described hereinafter, at least one line of a display may be configured by an instruction word which has previously been down-loaded to the pixels. Down-loading of digital instruction words may share the same path as, for example, ordinary analog data signals to the pixels.

The display may display "constants" such as "1" or "0" which are stored at the pixels. Although such values may be down-loaded in the same way as other image data, it is also possible for this to be achieved by "hard-wiring" at the pixels.

Some embodiments of the invention are also capable of a third type of operation. According to the third type of operation, the number and order of data display phases are fully independent of the number and order of data addressing phases.

BRIEF DESCRIPTION OF THE DRAWINGS

The invention will be further described, by way of example, with reference to the accompanying drawings, in which.

Like reference numerals referred to like parts throughout the drawings.

DESCRIPTION OF THE PREFERRED EMBODIMENTS

Figure 1:
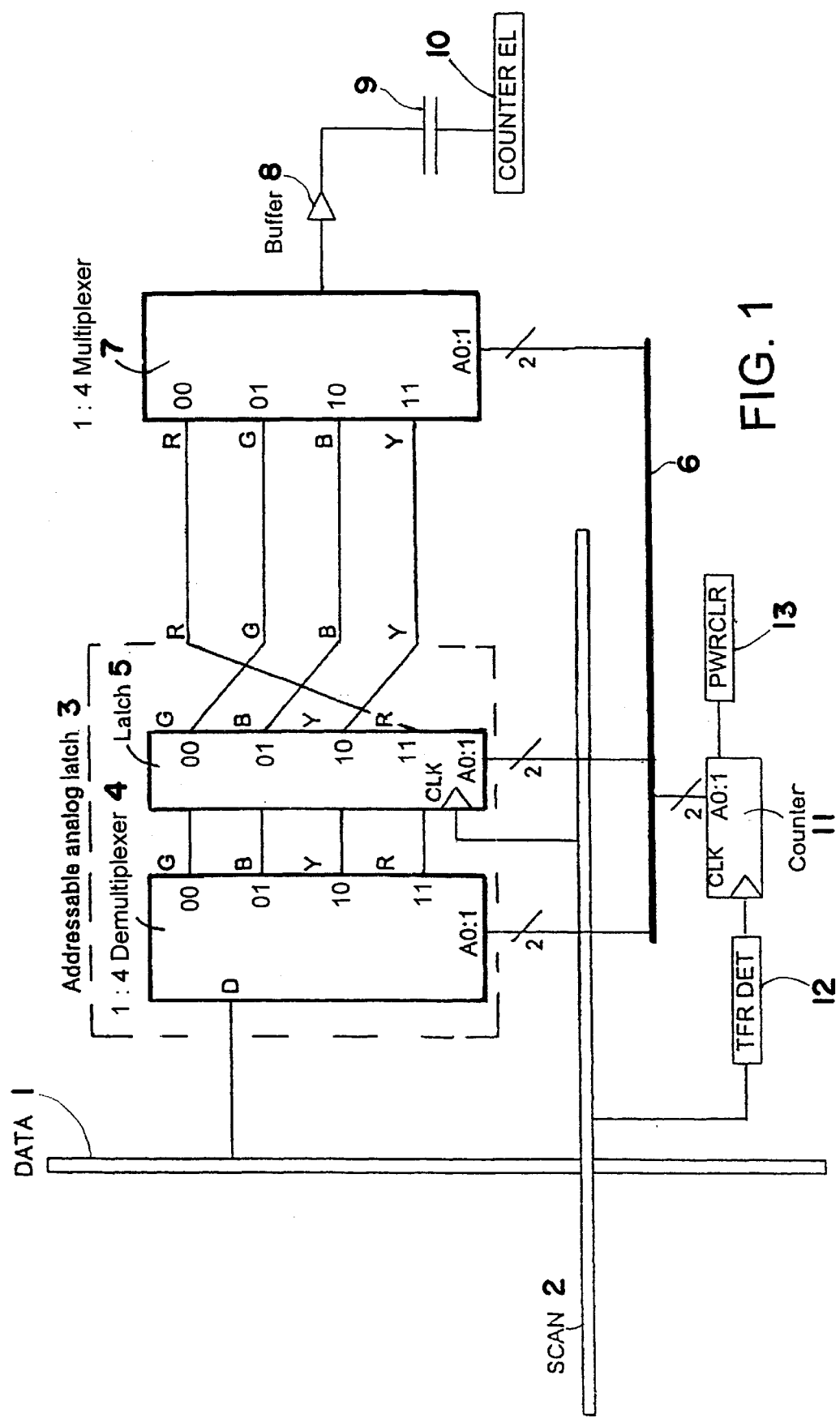
FIG. 1 is a circuit diagram of a first type of pixel of a display constituting an embodiment of the invention.

The pixel circuit shown in FIG. 1 is capable of the conventional first type of operation but is also capable of a second type of operation because loading of image data and displaying such data may be separated. The pixel is addressed by a data or column electrode 1 and a scan or row electrode 2. The pixel comprises an addressable analog latch 3 which comprises a 1:4 demultiplexer 4 and a latch 5. The demultiplexer 4 has a data input D connected to the data electrode 1 and a two bit parallel address input A0:1. The latch 5 has, in this embodiment, four storage locations for storing red (R), Green (G), Blue (B), and intensity (Y) pixel data of a frame of image data. Although the image data for the pixel could be stored digitally, in this embodiment the image data are stored in analog form, for example as a charge on a capacitor. The latch 5 has an enable or clock input CLK connected to the scan electrode 2 and a two bit parallel address input which is connected to the address input of the demultiplexer 4 to form an address input of the addressable analog latch 3 which is connected to an address bus 6.

The pixel further comprises a 4:1 multiplexer 7 whose four inputs are connected to respective storage locations of the latch 5. The output of the multiplexer 7 is connected via a buffer 8 to a display pixel 9 provided with a counter electrode 10. Although any type of display technology may be used, the embodiment illustrated makes use of liquid crystal display technology so that the pixel 9 comprises a liquid crystal pixel defined by suitable electrodes in a liquid crystal cell. The pixel 9 is illustrated as a capacitor which, to a first approximation, is the equivalent circuit of a liquid crystal pixel.

The address bus 6 is connected to the two bit output of a two bit counter 11. The counter 11 has a clock input connected to the output of a transfer signal or pulse detector 12 whose input is connected to the scan electrode 2. The counter 11 also has a reset input connected to a power clear circuit 13 for resetting the counter 11 each time power is applied to the display. Such a resetting arrangement is necessary in some of the embodiments described hereinafter but is not essential in others. In particular, in those embodiments such as that shown in FIG. 1, where the address inputs of the addressable analog latch 3 and the multiplexer 7 are connected together to the same counter 11, addressing of the latch 3 and the multiplexer 7 is automatically correctly synchronised and it is irrelevant which specific storage location of the latch 5 contains which colour image data. Operation is therefore the same whatever the power-up "count" of the counter 11.

During normal operation of a display comprising pixels of the type shown in FIG. 1, image data are supplied to the data electrodes 1, for example a row at a time, and are scanned into the pixels by scan pulses supplied one at a time in a repeating sequence on the scan electrodes 2. Thus, addressing takes place a row at a time until the display has been refreshed with a complete frame of image data, after which the process is repeated for each new frame. The transfer pulse detector 12 is arranged to ignore scan signals or pulses for addressing the pixels but to detect transfer pulses on the scan electrodes 2 and to increment the counter 11 by one for each transfer pulse. Conversely, the clock input of the latch 5 is insensitive to the transfer pulses but responds to each scan pulse or signal to latch new image data into the storage location selected by the address supplied by the counter 11. The transfer pulse detector 12 may be of the type disclosed in British Patent Application No. 9825152.3, herein incorporated by reference.

The counter 11 cycles repeatedly through binary values 00,01,10 and 11 in response to the transfer pulses. By way of illustration only, the address 00 is allocated in the demultiplexer 4 and the latch 5 to green image data for addressing and refreshing of the pixel. Similarly, the binary values 01, 10 and 11 correspond to blue, intensity and red image data, respectively, during addressing. However, as illustrated in FIG. 1, the binary addresses 00, 01, 10 and 11 correspond to display by the pixel of red, green, blue and intensity image data, respectively. Thus, the addressable analog latch 3 and the multiplexer 7 are addressed in first and second sequences which are identical but which are one step out of phase. For example, when the addressable latch 3 is addressed so as to be capable of receiving fresh green image data, the multiplexer 7 causes the display pixel 9 to display the red image data from the red storage location in the latch 5.

Figure 2:
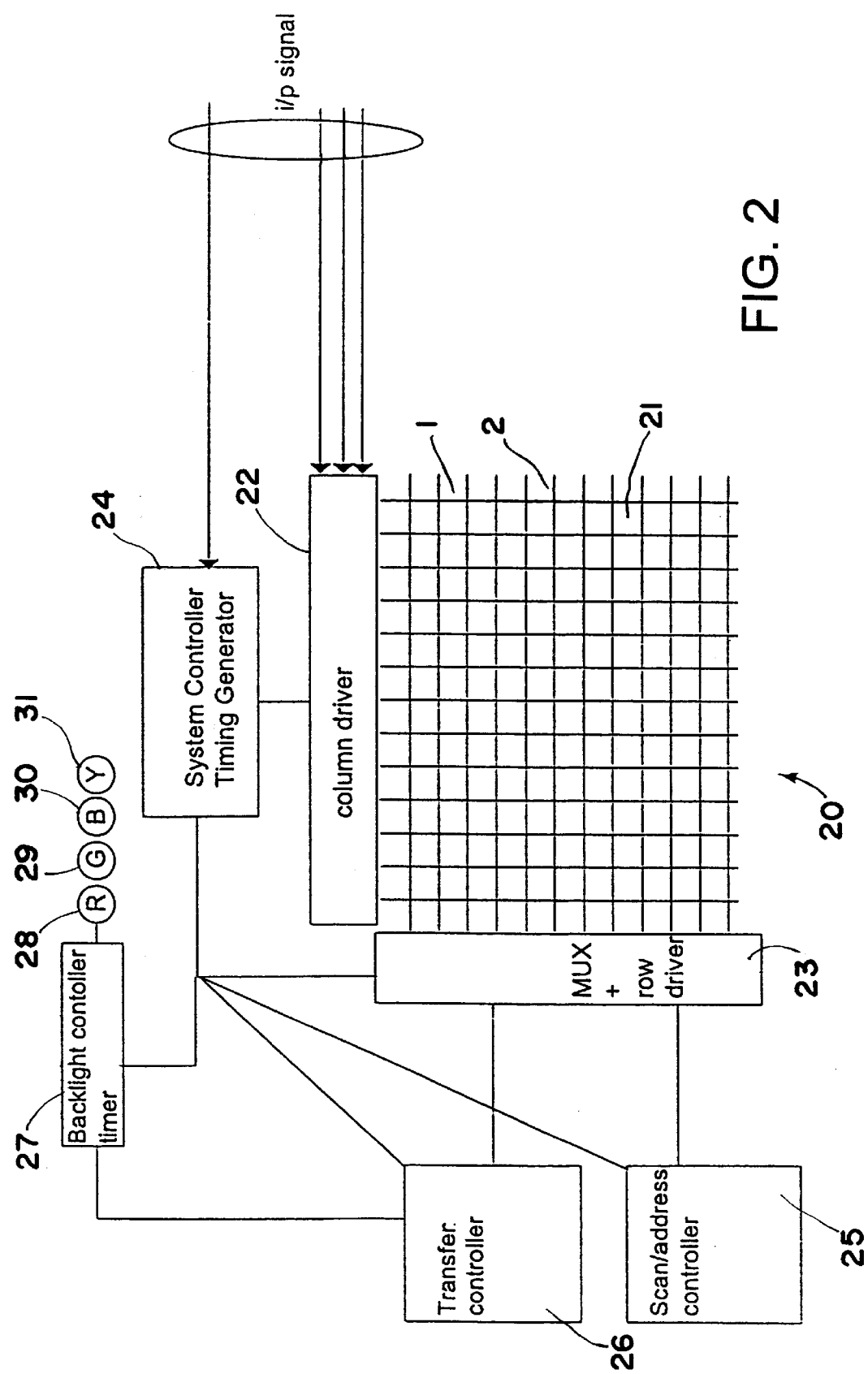
FIG. 2 is a block diagram of a display constituting an embodiment of the invention and comprising pixels of the type shown in FIG. 1.

FIG. 2 shows a complete display comprising a matrix 20 of pixels 21 of the type shown in FIG. 1. The display comprises a column driver 22 which receives image data at its inputs, for instance in the form of serial video data with the colour components being supplied on separate inputs in parallel. As an alternative, the serial video data may have all colour components supplied on a single input. The column driver 22 assigns the appropriate pixel data to the data electrodes 1 so as to refresh the matrix 20 a row at a time. The scan electrodes 2 are connected to a multiplexer and row driver 23 which supplies the scan and transfer pulses with the appropriate timings. A system controller timing generator 24 receives input video sync signals and controls the timing of the column driver 22, the multiplexer and row driver 23, a scan/address controller 25, a transfer controller 26 and a backlight controller timer 27.

The scan/address controller 25 is arranged to supply scan signals via the multiplexer and row driver 23 to one scan electrode 2 at a time in a repeating sequence, for example starting at the top row and proceeding down the rows until all of the rows of matrix 20 have been refreshed, after which the process is repeated. During addressing of the matrix 20, the multiplexer and row driver 23 passes the scan signals from the controller 25 to the scan electrodes 2. The transfer controller 26 supplies transfer pulses in accordance with the desired mode of operation of the display and these are supplied to the scan electrodes 2 via the multiplexer and row driver 23. The controller 26 also supplies signals to the timer 27 so as to ensure that the backlight is correctly synchronised with the display of image data.

In the display shown in FIG. 2, the backlight comprises individual light sources or groups of light sources 28 to 31 for illuminating the display with the different colours. In the embodiment illustrated, the backlight comprises red, green, blue and white light sources or groups of sources. The backlight controller timer 27 supplies power to the light sources 28 to 31 with the correct timing in relation to the display of image data.

The pixel circuitry and the display driver circuitry shown in FIG. 2 may be fully or partially implemented with the same technology, for example in amorphous silicon, polycrystalline silicon, monocrystalline silicon or cadmium selenide. Alternatively, the pixel circuitry and the driver circuitry or part thereof may be embodied by different technologies or by a combination of the above technologies. Related technologies such as chip on glass (COG) or tape automated bonding (TAB) may also be used. In the case of a fully integrated implementation, for example, poly-silicon technology may be used for both the pixel electronics and the driver electronics. It is also possible for the driver electronics to be implemented partly in poly-silicon and partly in COG crystalline silicon. It is further possible for the whole of the pixel and driver circuitry to be implemented on an LSI backplane.

As described hereinafter, addressing and display of image data may be performed in accordance with a first or second type of operation. For example, in the second type of operation, it would be possible to load the display at a frame rate of 30 Hz, which eases the design specification of the column driver 22, but to display the image data at a frame rate of 60 Hz in order to reduce flicker. Thus, the addressing of the display, which is typically driven from a personal computer (PC) source in many applications, can be separated from the output or display part, which may then be determined by human factors so as to reduce or eliminate undesirable visible artefacts. This arrangement is particularly suitable for implementation by poly-silicon technology because the resulting slower addressing rate is easier to implement in poly-silicon driver circuitry and the pixel circuitry is also suitable for implementation in poly-silicon technology.

Figure 3:
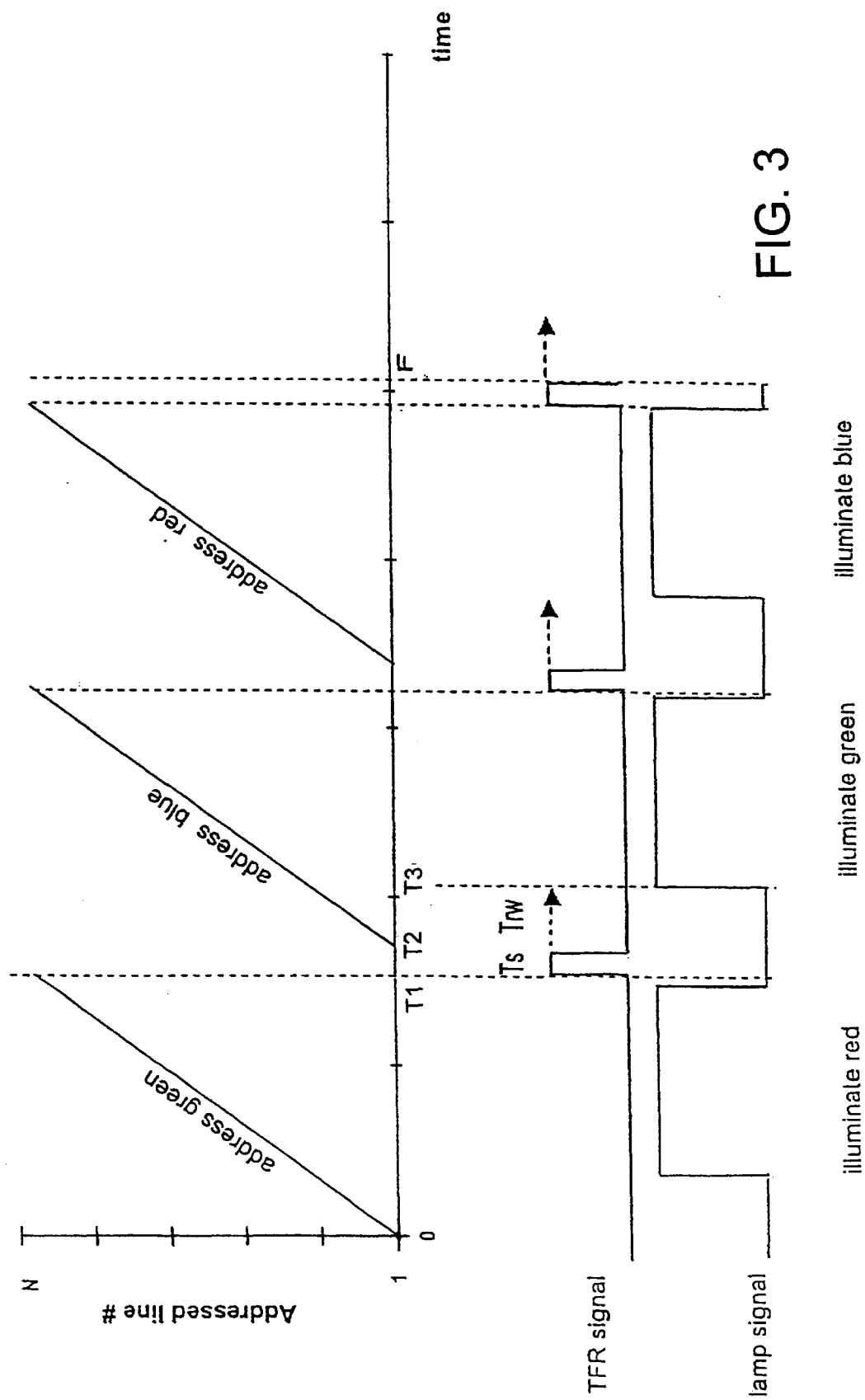
FIG. 3 is a timing diagram illustrating waveforms occurring during the first type of operation of the display of FIG. 2.

The display shown in FIG. 2 using pixels of the type shown in FIG. 1 may be used for the first type of operation, for example as illustrated in FIG. 3. The transfer (TFR) signal and the lamp signal are shown as conventional waveforms whereas the line addressing performed by the controller 25 is illustrated as a continuous sawtooth waveform of addressed line number against time although, in practice, the rows are addressed discretely. The rows are addressed in turn from top to bottom where the top row has address line number 1 and the bottom row has address line number N.

At time 0, addressing of green image data begins following a previous red image data addressing phase. The counter 11 supplies the binary address 00 to the addressable analog latch 3 and to the multiplexer 7 of each of the pixels 21. Thus, the de-multiplexer 4 connects the green storage location to the data electrode 1 whereas the multiplexer 7 connects the red storage location of the latch 5 via the buffer 8 to the pixel 9. Scan pulses are supplied to the scan electrodes 2 one at a time so that, at time T1, all of the pixels 21 of the matrix 20 have been addressed and refreshed with new green image data. During this time, the red light source or group of sources 28 is illuminated to display the red field of the image frame.

Just before time T1, power supply to the red light source 28 is removed by the timer 27 so as to allow time for the light source to extinguish and stop emitting red light. At the time T1, a transfer signal Ts is supplied by the transfer controller 26 via the multiplexer and row driver 23 simultaneously to all of the scan electrodes 2. The counter 11 of each pixel is incremented by one so as to supply the binary address 01. The multiplexer 7 supplies the green image data from the green storage location of the latch 5 via the buffer 8 to the pixel 9. After a time period Trw sufficient for the electro-optic material of the pixels 9 to respond to the new electric field applied thereto, the green light source or group of light sources 29 is illuminated at time T3 so as to display the green field of the time sequential colour image.

At time T2 corresponding to the falling edge of the transfer pulse Ts, the multiplexer and row driver 23 supplies the scan signals from the controller 25 in turn to the scan electrodes 2 of the matrix 20. The multiplexer 4 of each pixel connects the data electrode 1 to the blue storage location so that addressing and refreshing of the blue image data can take place.

This process is repeated for each of the individual fields of the frame in turn. FIG. 3 illustrates refreshing and display of red, green and blue fields without the presence of any intensity fields. This may be achieved by omitting the circuitry in FIG. 1 relating to the Y field. Alternatively, this may be achieved by allocating the red image data to the storage location of the latch 5 shown as storing the Y image data in FIG. 1 and, when the counter 11 has reached binary 10, by supplying a double transfer pulse to each of the counters 11 so as to reset the counter to binary 00. This causes the pixels to cycle through the red, green and blue phases and the rapid succession of two transfer pulses after the red addressing phase is too quick for the material of the pixels 9 to respond so that the red field is effectively displayed immediately after the blue field.

Figure 4:
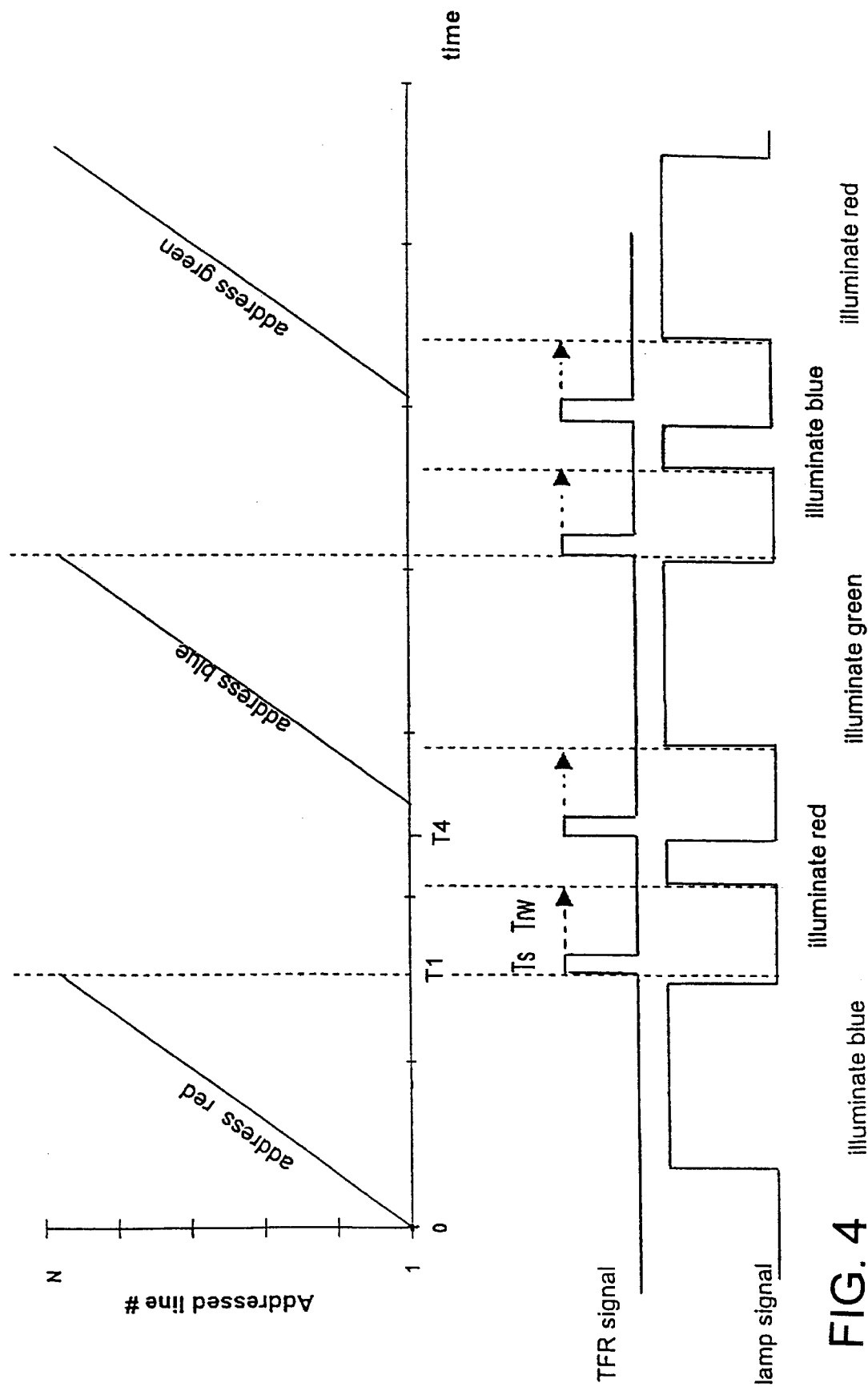
FIG. 4 is a timing diagram illustrating waveforms occurring during a first example of a second type of operation with different addressing and display rates of the display of FIG. 2.

FIG. 4 illustrates an example of the second type of operation of the display shown in FIG. 2 using pixels of the type shown in FIG. 1. In the mode illustrated, two display phases are executed for each addressing phase. Again, the display is of the RGB colour sequential type e.g. with the Y phase omitted or disabled in the pixels shown in FIG. 1. At time 0, addressing of the red field begins and, shortly thereafter, the blue light source 30 is illuminated to display the blue field.

Just before time T1, the blue light source is extinguished and, at the time T1, a transfer pulse Ts is supplied to all of the scan electrodes 2. The counters 11 of the electrodes are thus incremented so that the red image data are supplied to the pixels 9. Following the electro-optic material response time Trw, the red light source 28 is illuminated so as to display the red field. However, no addressing phase is associated with display of the red field.

The red source is subsequently extinguished and, at time T4 another transfer pulse is supplied simultaneously to the scan electrodes 2. The counters 11 of the pixels are incremented and, immediately after the transfer pulse, a blue addressing phase begins. When the liquid crystal material has had time to respond to the green image data which are now supplied via the multiplexer 7 of the pixels, the green light source is illuminated.

After the blue addressing phase has been completed, a further transfer pulse is supplied to the scan electrodes 2, after which the blue light source is again illuminated. Again, there is no addressing phase associated with this phase of blue illumination. At the end of this blue field display phase, a further transfer pulse is applied to the scan electrodes 2 and this is followed by a green addressing phase, during which the red field is again displayed and illuminated. Thus, two display phases occur following each addressing phase.

Figure 5:
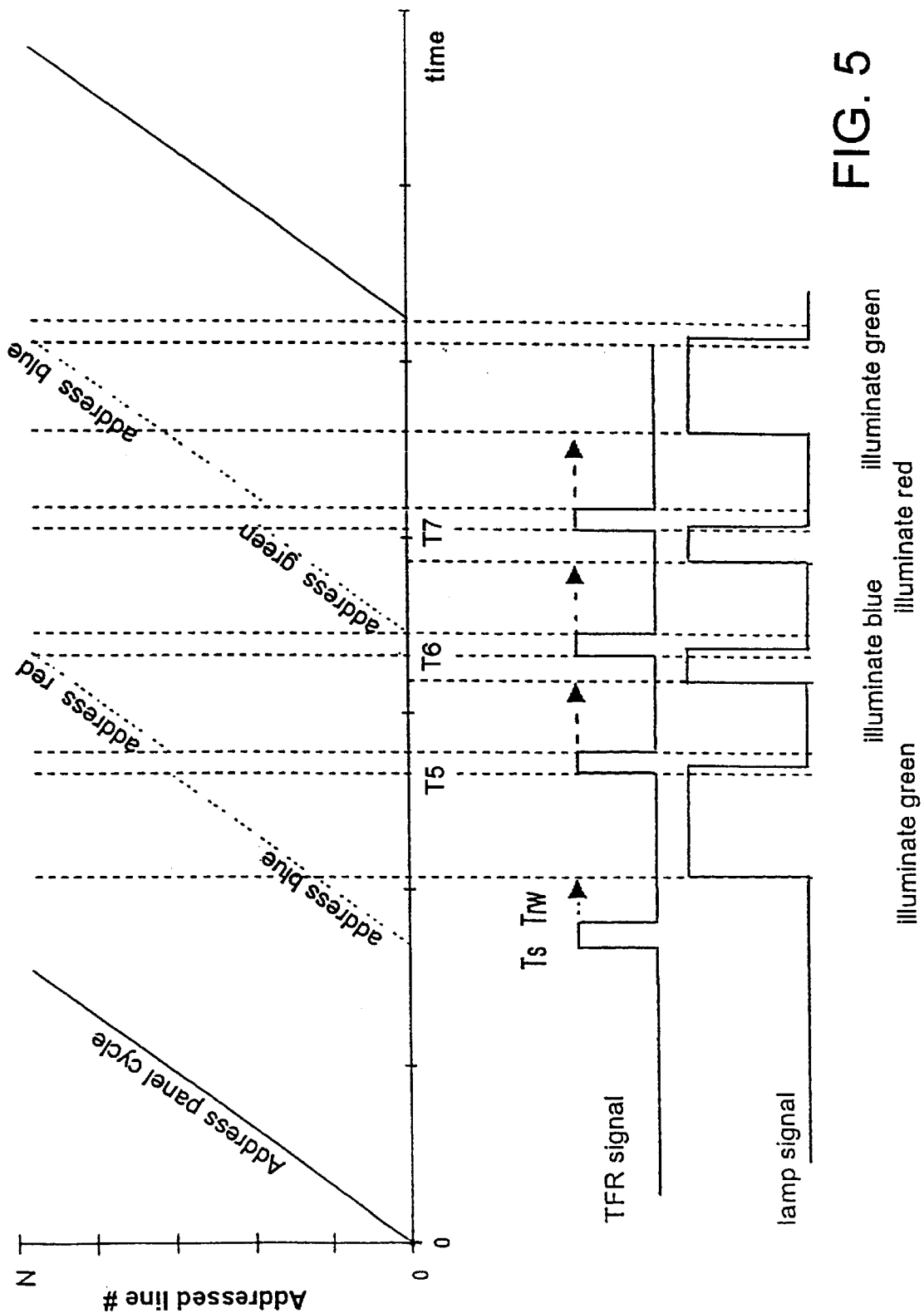
FIG. 5 is a timing diagram illustrating waveforms occurring during a second example of the second type of operation of the display of FIG. 2.

FIG. 5 illustrates another example of the second type of operation, in which a display phase may be initiated during an addressing phase. A blue addressing phase and a green display phase are shown initially in FIG. 5. However, at time T5, a transfer pulse is supplied before the end of the blue addressing phase. The green illumination is extinguished and, after a delay corresponding to the maximum response time of the liquid crystal material, blue illumination is provided. The discontinued blue addressing phase is replaced by the later part of a red addressing phase until another transfer pulse is supplied at time T6. This corresponds to the end of the partial red addressing phase. The pixel counters 11 are incremented again and a green addressing phase begins after the transfer pulse. The blue illumination is extinguished and is replaced, after the delay corresponding to the liquid crystal response time, by red illumination.

At time T7, another transfer pulse is supplied to the scan electrodes 2. The green addressing phase is interrupted and the red illumination is extinguished. After the transfer pulse, addressing begins again part of the way through another blue addressing phase, which may represent the completion of the previous partial blue addressing phase. Again, after the appropriate delay, green illumination is provided.

This mode of operation provides a display update rate which is faster than the data input rate. It is thus possible to reduce display flicker by increasing the display rate, for example above 60 Hz, without having to increase the basic input data rate.

As also illustrated in FIG. 5, this type of operation may be used to provide different illumination times for the different colours without having to use an entire display cycle, as would be necessary in the first type of operation illustrated in FIG. 3. This may be used to compensate, for example, for different light output levels from different fluorescent tube colour phosphors or different colour light emitting diodes of the backlight. For convenience, each addressing phase may be interrupted at its midpoint so that each field addressing phase is completed in two cycles or halves.

Figure 6:
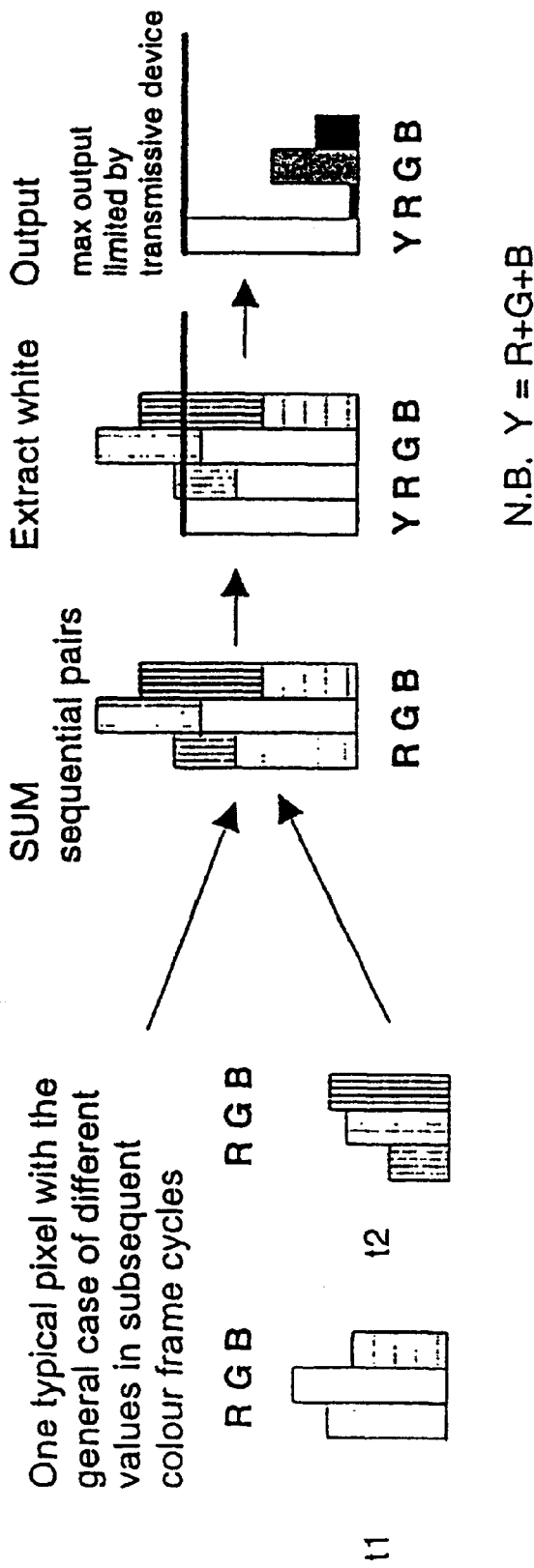
FIG. 6 is a diagram illustrating the operation of the display of FIG. 2 for converting RGB image data to RGBY image data.

FIG. 6 illustrates a technique which may be used to obtain increased effective display brightness. Typical pixel RGB levels are shown at t1 and t2 for consecutive colour frames. Although these are substantially different, it is typical for a pixel to display approximately the same image data in consecutive frames. The individual RGB values may be conceptually summed as shown and the white "pedestal" part may then be extracted with the residual RGB parts being used to achieve the required colour. The output comprises YRGB components which may be displayed in a single colour frame. It is thus possible to replace six colour fields (comprising two RGB frames) by four colour fields (comprising a single RGBY colour frame).

Such an arrangement is particularly advantageous where emission from a white light source of the backlight is more efficient than from other colours. This may be the case with fluorescent lamps used in time sequential colour displays where the fast on-off phosphor requirement may be better met from a white phosphor than from one or more of the component colours. Such an arrangement is particularly advantageous where the colours in the backlight are produced by filtering white light using absorptive filters, for example in some types of organic electro-luminescent materials. The overall brightness of the display may thus be increased and/or the power consumption may be decreased.

Figure 7:
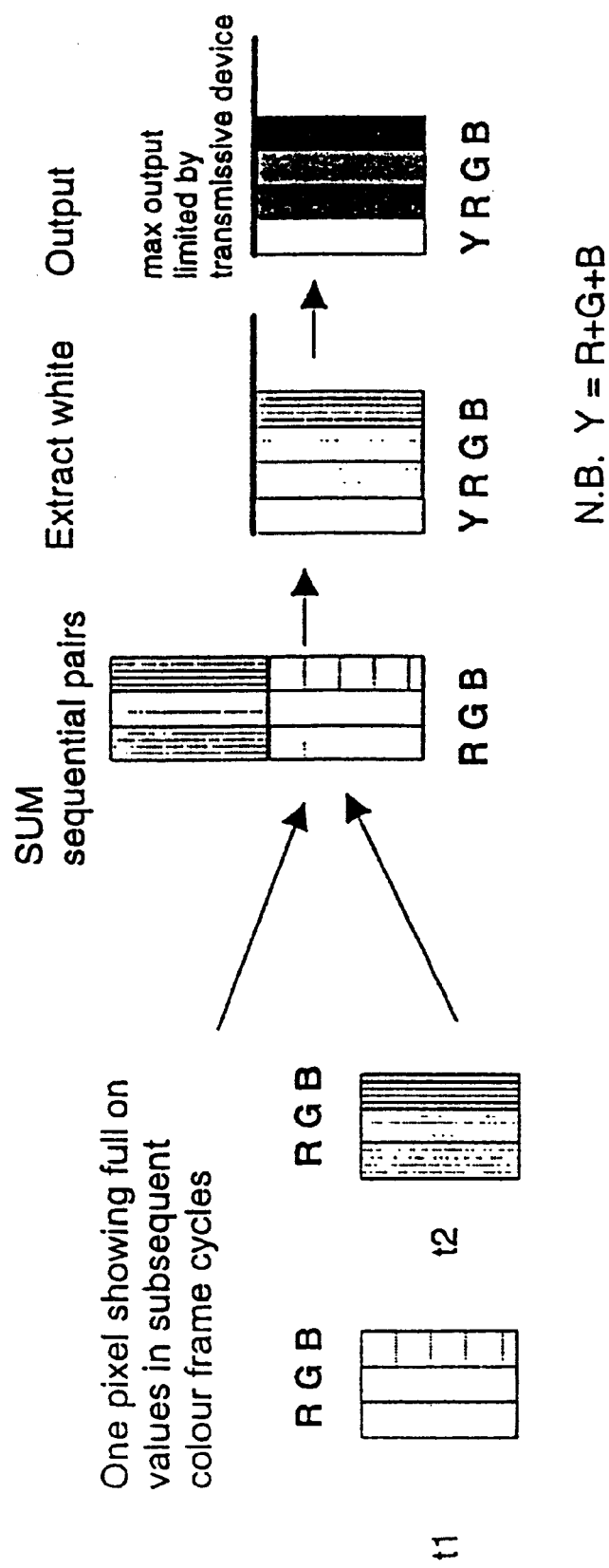
FIG. 7 is a diagram similar to FIG. 6 but illustrating the peak-white case.

FIG. 7 illustrates the same technique for the peak white case where consecutive pixels are required to display the maximum white level.

Figure 8:
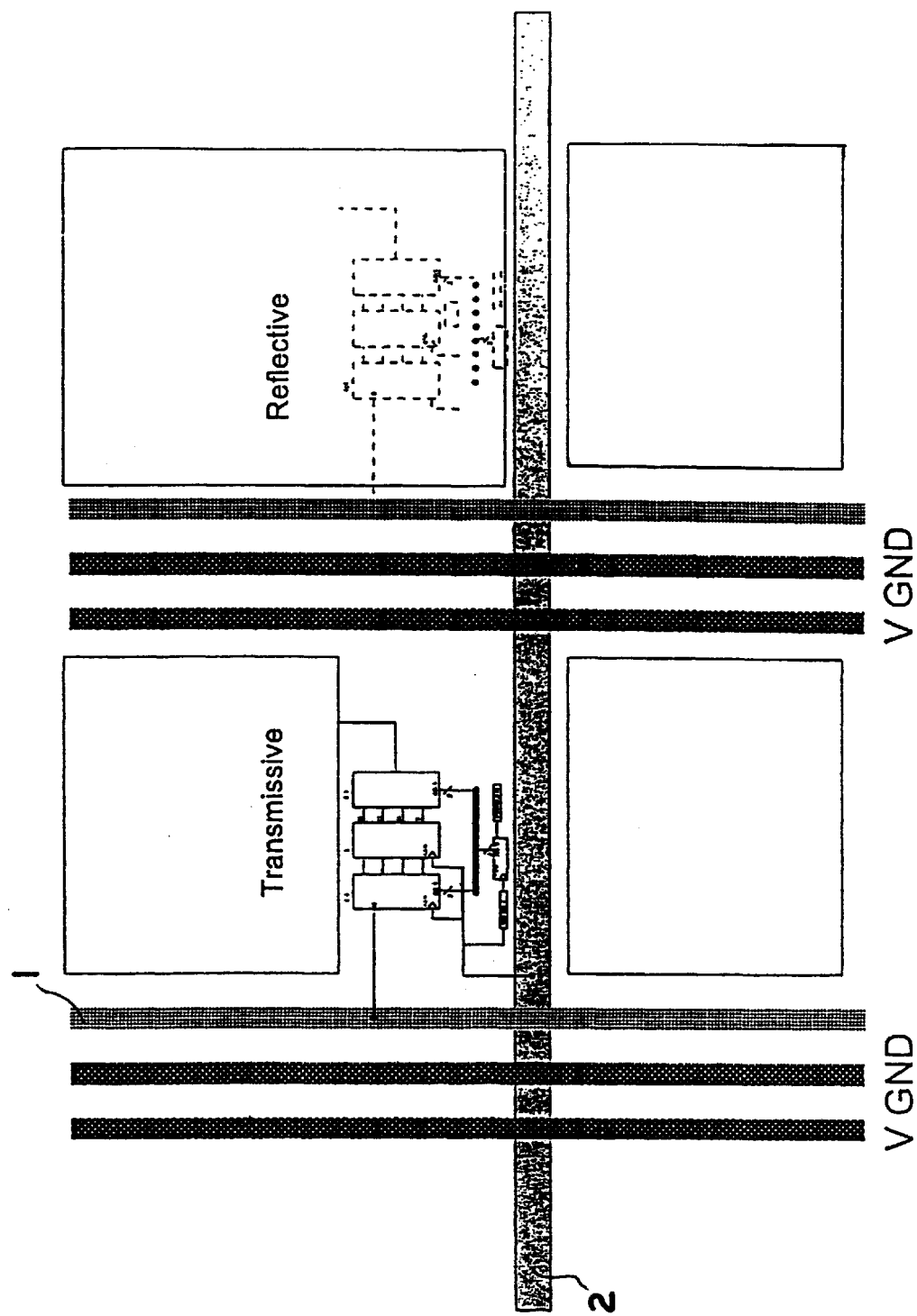
FIG. 8 is a diagram illustrating an example of display component layout for the display of FIG. 2.

FIG. 8 illustrates diagrammatically the layout of some of the pixels of the matrix 20. A transmissive pixel is illustrated at 21a whereas a reflective pixel is illustrated at 21b. The area occupied by the pixel electronics is greater than that required by conventional thin film transistor active matrix displays and, because this part of the pixel is not optically switched, is generally covered by a black matrix. However, in the reflective case, a reflector may cover the active circuitry so that substantial circuitry can be incorporated without affecting the aperture ratio of the display.

Figure 9:
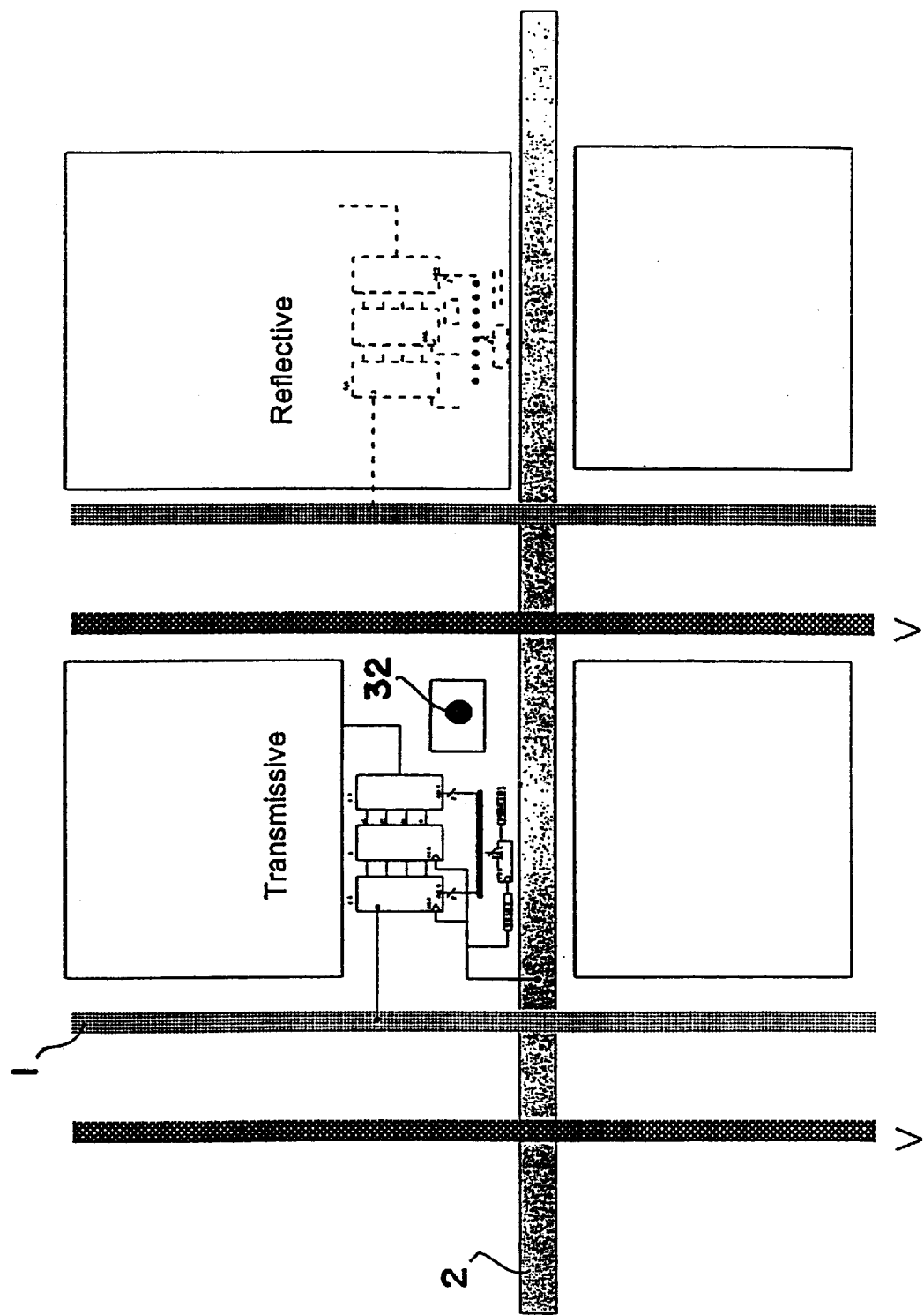
FIG. 9 is a diagram illustrating another example of display component layout for the display of FIG. 2.

It is necessary to supply power to the pixel circuitry and this is illustrated in FIG. 8 in the form of a supply line V and a ground line GND. However, FIG. 9 illustrates an arrangement in which the ground line GND may be replaced by direct connection from the counter electrode. This connection may, for example, be formed by a connector ball 32, which also serves as a liquid crystal layer spacer. The region of the spacer may be covered with the black mask to avoid unwanted visible effects as a result of variations in the liquid crystal director orientation around the ball. For instance, the spacer may be embodied as an axial conductor surrounded by an insulator to avoid any direct electrical connection to the liquid crystal. The position of the spacer is also arranged to be outside the pixel electrode area so as to avoid any short circuits.

Figure 10:
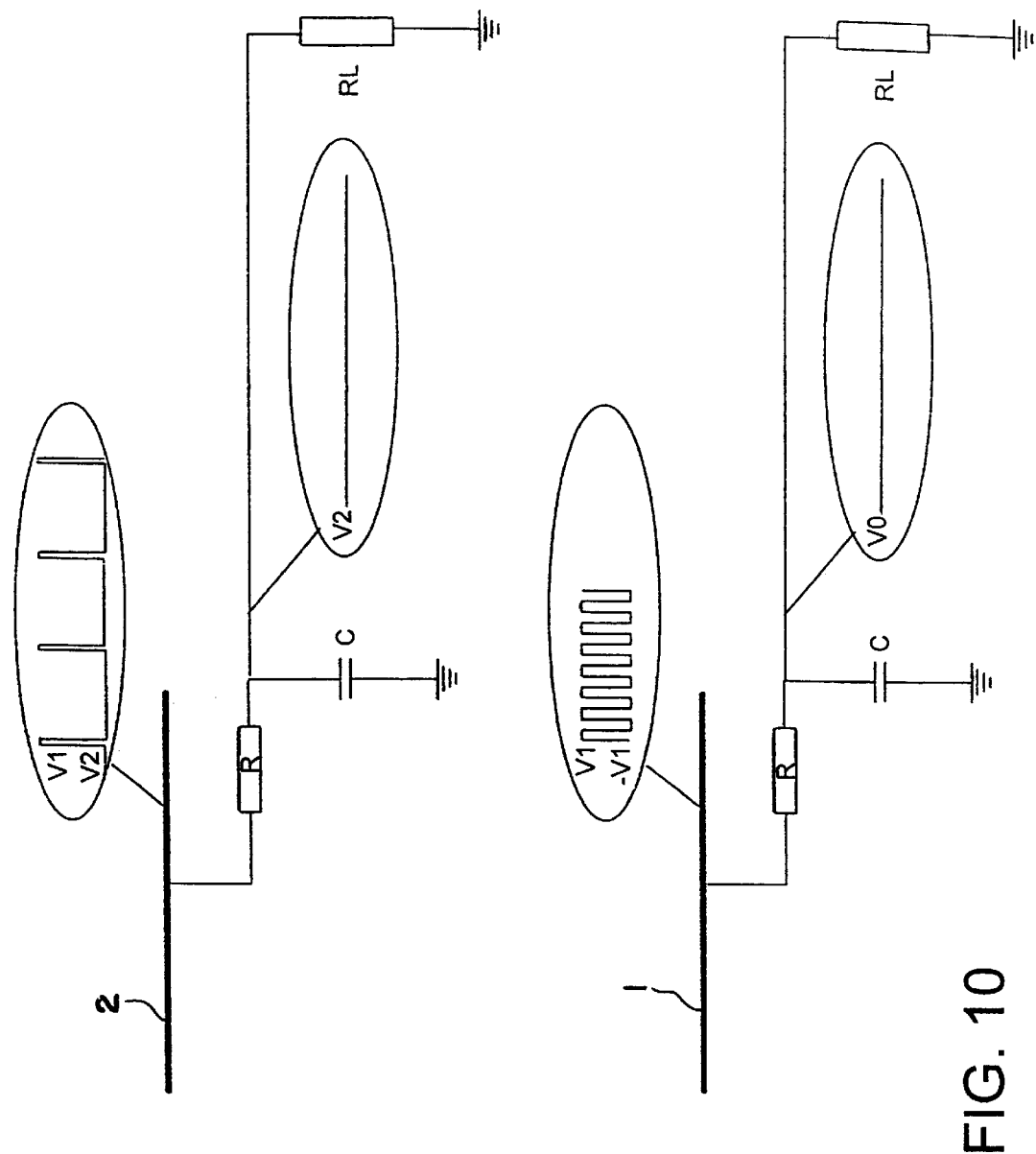
FIG. 10 is a circuit diagram illustrating a technique for deriving pixel power supply by filtering the signal from a data or scan line.

It may also be possible to eliminate the supply lines V by deriving a supply of power for the pixel electronics from the data electrodes 1 or the scan electrodes 2 within each pixel circuit. This is illustrated in FIG. 10 for supplying current to the circuitry, illustrated as a resistive load RL, from the data electrode 1, which carries an alternating signal generally in the form of an analog wave, and from the scan electrode 2, which generally carries a pulse signal. A supply of power may be obtained by relatively simple filtering, illustrated in FIG. 10 as an isolating resistor R and a filtering or smoothing capacitor C. Techniques of this type are disclosed in GB 2 312 773 and EP 0 807 918.

Figure 11:
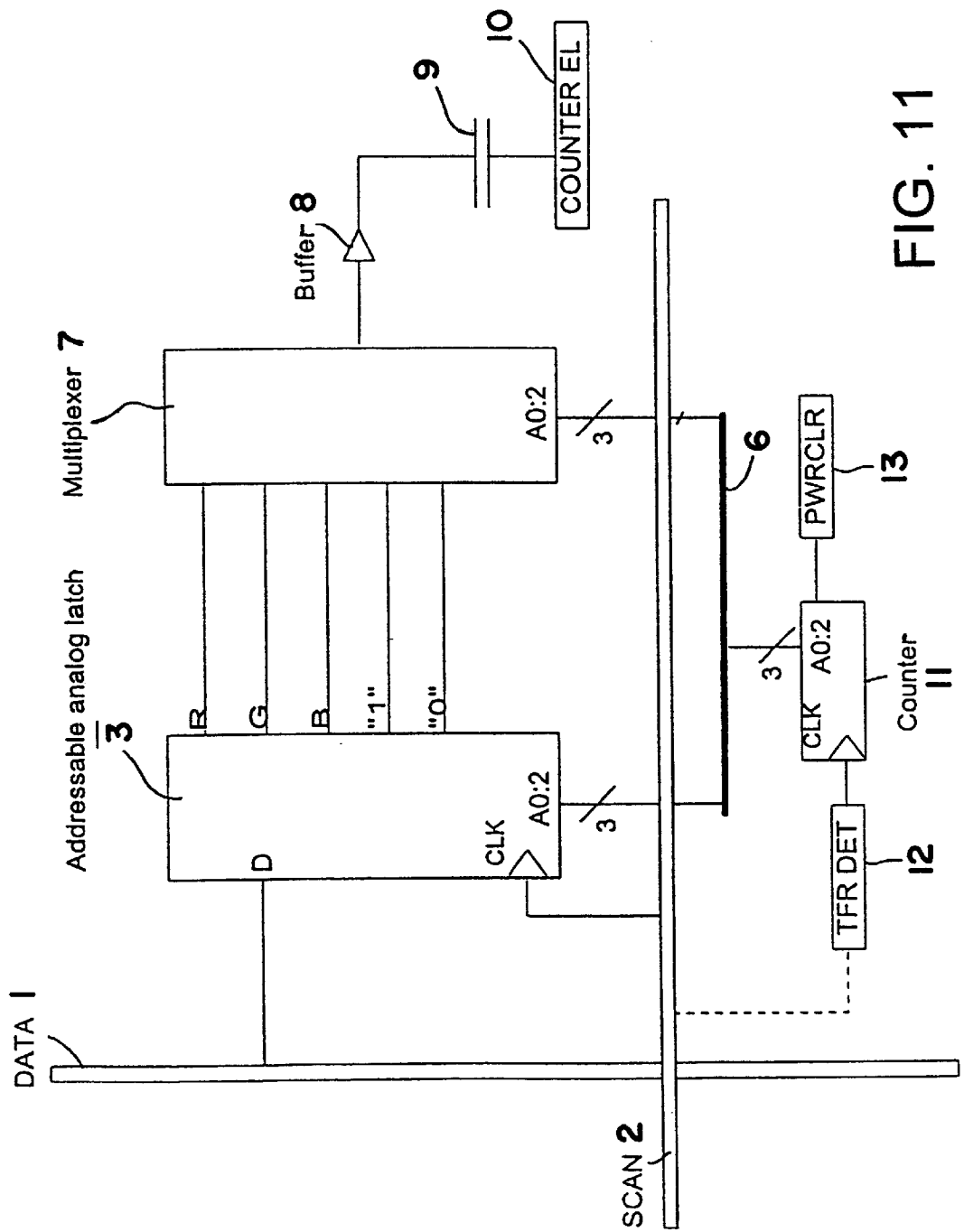
FIG. 11 is a circuit diagram of a second type of pixel of a display constituting an embodiment of the invention.

The pixel illustrated in FIG. 11 differs from that shown in FIG. 1 in that the counter 11 is a three bit counter and the addressable analog latch 3 and the multiplexer 7 have three bit address inputs. Such an arrangement allows up to eight storage locations in the latch 3 and hence up to eight items of image data to be stored at the pixel. However, only five items are used in the application illustrated in FIG. 11 and the counter 11 is arranged to operate modulo 5. As shown in FIG. 11, this may be used to provide two constant values which may be hard-wired so as not to required downloading. Alternatively, these values may be down-loaded, for instance at the beginning of operation of the display or at any other time when the values need to be changed. If the storage mechanism of the analog latch 3 results in deterioration with time, the constant values may be occasionally down-loaded so as to refresh the storage locations.

Figure 12:
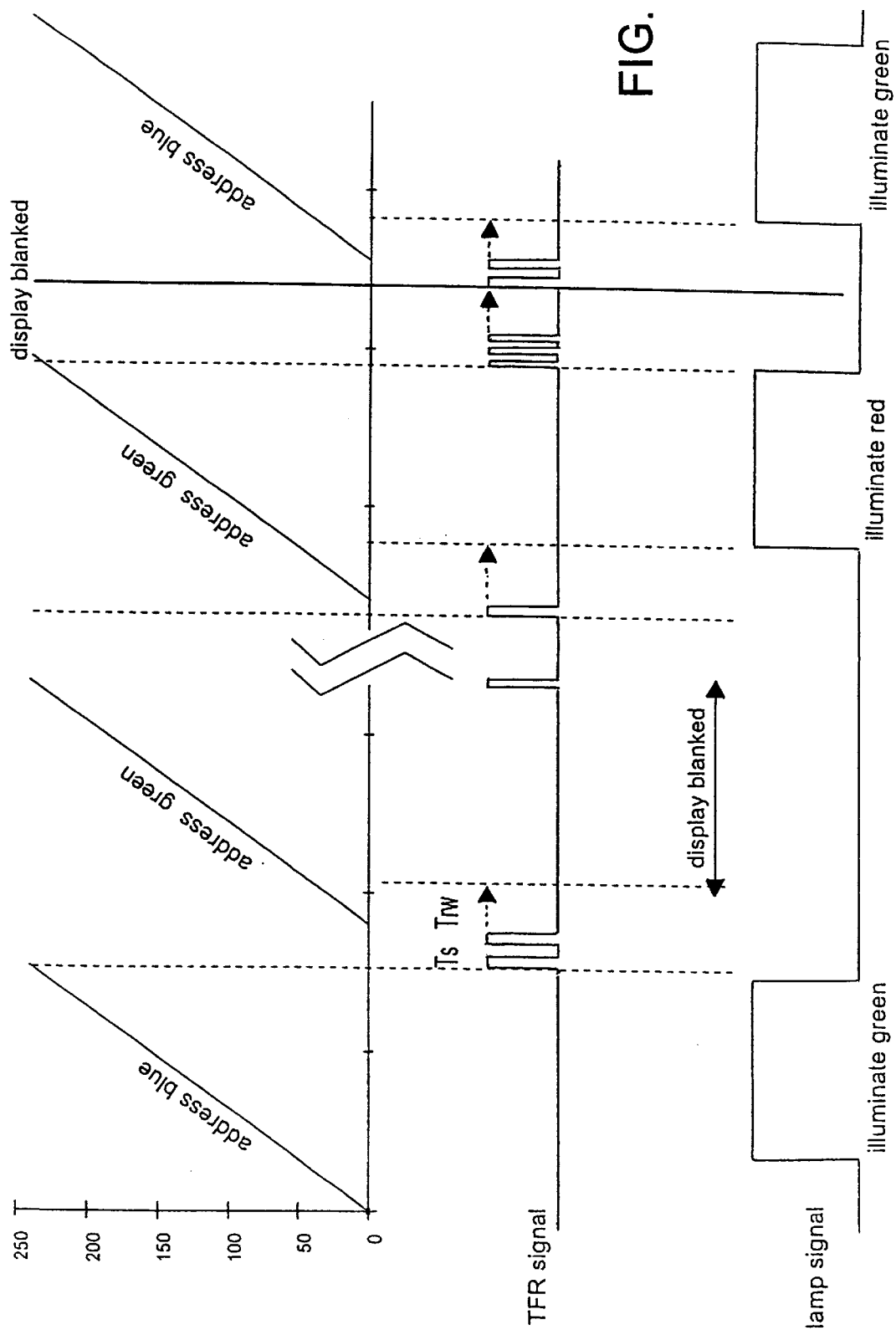
FIG. 12 is a timing diagram illustrating waveforms occurring during a third example of the second type of operation with electronic blanking of a display comprising pixels of the type shown in FIG. 11.

FIG. 12 illustrates how a display comprising the pixels shown in FIG. 11 may be used to implement electronic blanking in the second type of operation. Such blanking may be used to make the display simulate more closely the behaviour of the phosphor of a conventional cathode rate tube in that the image returns to black relatively quickly after it has been displayed. This may be useful in reducing undesirable visual artefacts which may arise from fast moving objects in an image. This mode of operation makes use of the RGB values and of the constant "1" or "0" value as required to implement blanking in the liquid crystal or other display mode being used. The display therefore operates in an RGB0 mode. In this context "1" and "0" represent the analog voltages required to produce full "on" and full "off" states, respectively, with the electro-optic effect being used.

As shown in the left hand part of FIG. 12, after display of the green field, two transfer pulses are supplied in quick succession without any intervening addressing phase so that the display is switched from a green display phase to a blanking phase. The display is blanked during the subsequent green addressing phase, during which time the backlight may be illuminated or switched off. At the end of the blanking phase, one or more transfer pulses are supplied to reset the display/addressing phase to the required point for subsequent operation. Because multiple transfer pulses can be provided in rapid succession, the response time of the liquid crystal material is too long for there to be any significant visible response so that the optical output of the display is substantially unaffected by multiple transfer pulses.

The right hand part of FIG. 12 illustrates how blanking may be performed immediately after an addressing phase. This may be used to improve the response speed of the liquid crystal switching process, for instance in the case of the pi-cell in which total switching times can be reduced by blanking or resetting the liquid crystal between addressing phases.

After the red display phase, three transfer pulses are supplied so as to switch the display to the blanking phase. The rapid passage through the green and blue data does not substantially effect the display because the pulses are executed faster than the response time of the liquid crystal material. After the liquid crystal material has achieved blanking, further transfer pulses are supplied so as to switch the display to the desired point within its cycle of operation. For example, two transfer pulses are shown so as to set the display to the start of a green display phase and a blue addressing phase.

Figure 13:
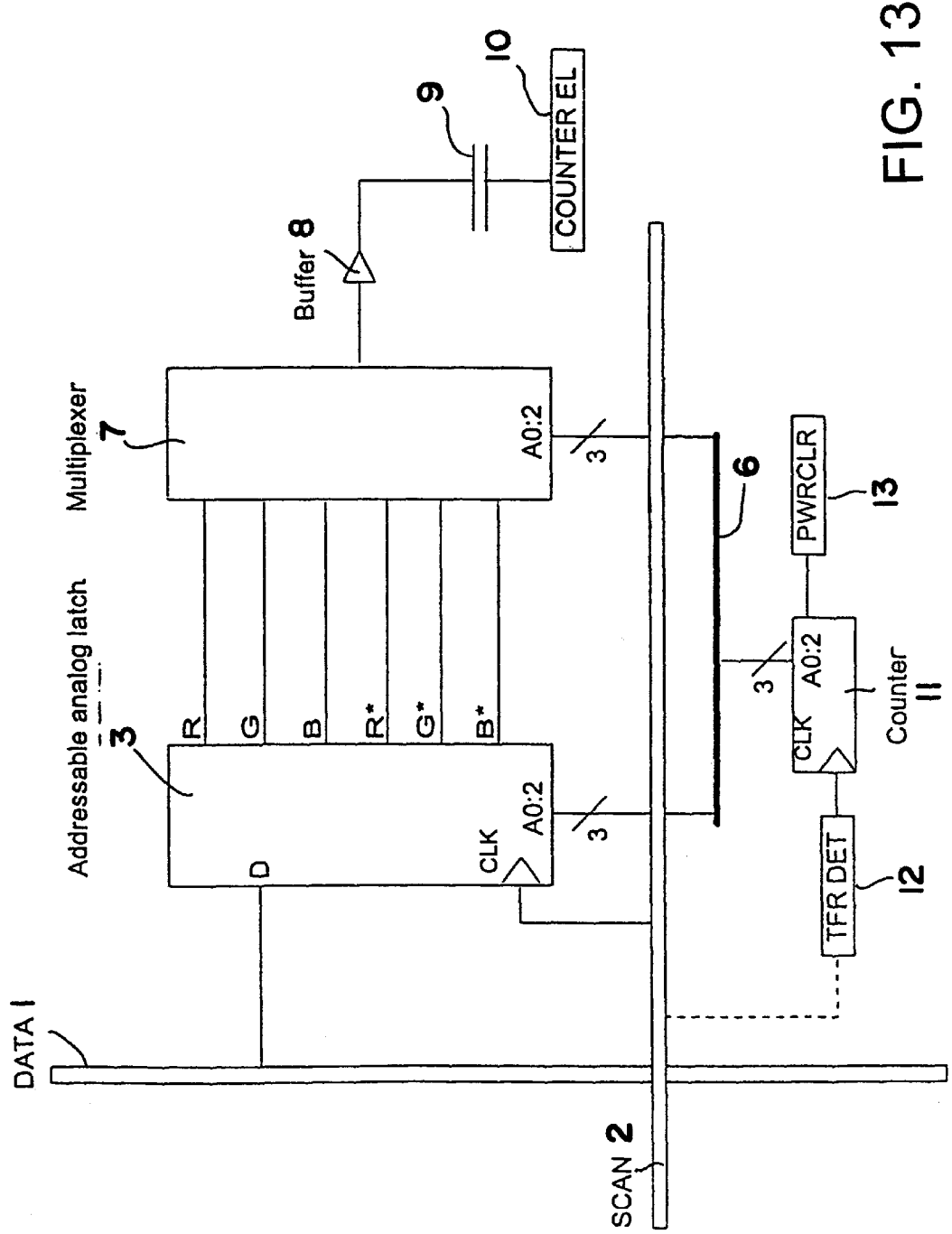
FIG. 13 is a circuit diagram of a third type of pixel of a display constituting an embodiment of the invention.

FIG. 13 illustrates a pixel of the type shown in FIG. 11 but with the counter 11 arranged to count modulo 6 and the latch 3 and the multiplexer 7 arranged to handle six items or values of image data. This arrangement is illustrated for multiple RGB phases in a frame cycle, for instance so as to implement a scheme in which colour channel information is disposed in two or more data sets which are displayed at different times. The data sets RGB and R*G*B* may contain different parts of a desired greyscale value and this technique may be used to reduce the effects of flicker. Alternatively, the two sets of values may be substantially different in order to provide a display for use with asymmetric materials, such as antiferroelectric liquid crystals (AFLCs), for example as disclosed in GB 2 324 899 and EP 0 875 881.

Figure 14:
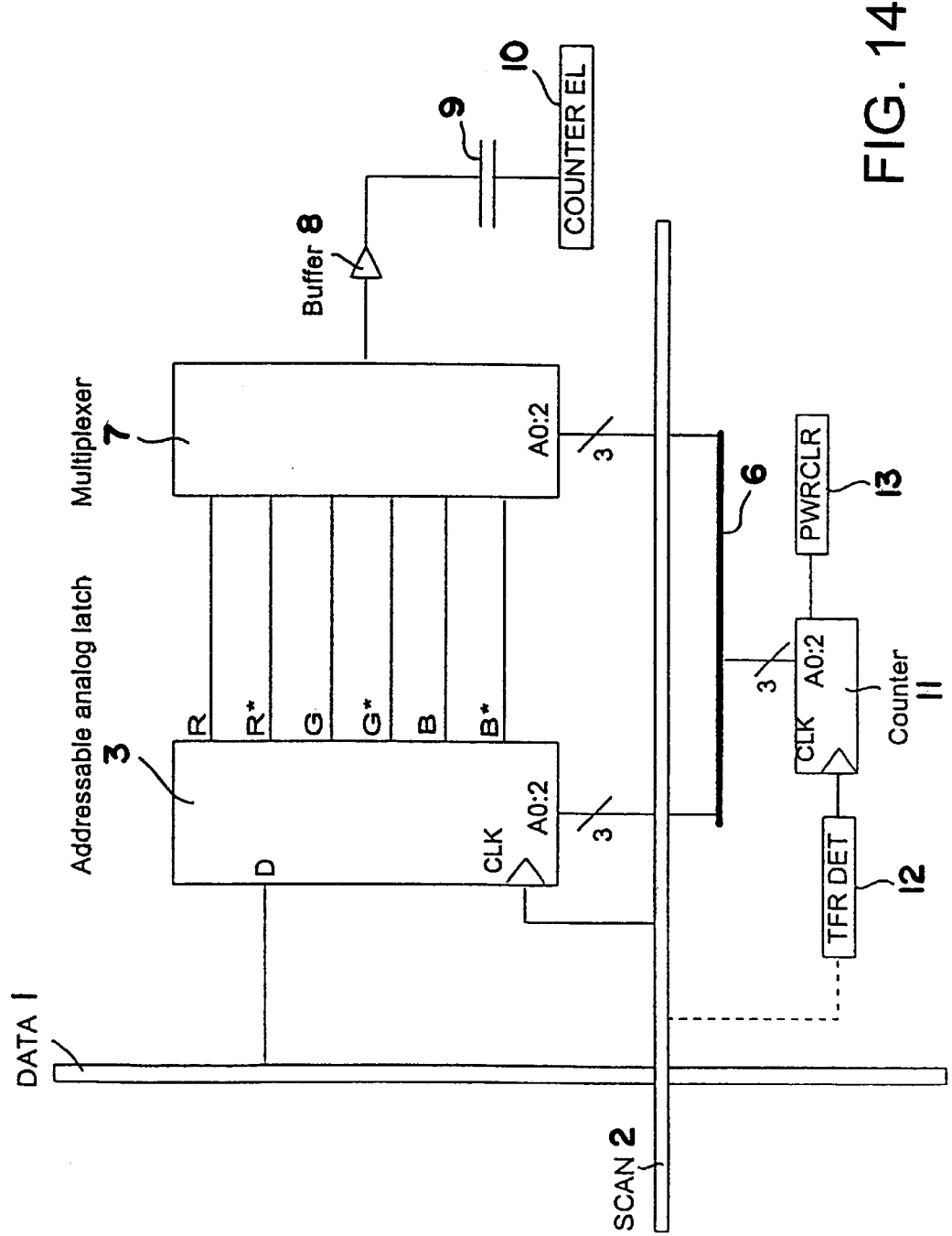
FIG. 14 is a circuit diagram of a fourth type of pixel of a display constituting an embodiment of the invention.

FIG. 14 illustrates a pixel which is substantially identical to that illustrated in FIG. 13 but in which the colour phases are rearranged by rearranging the image data or values in the storage locations of the latch 3.

Figure 15:
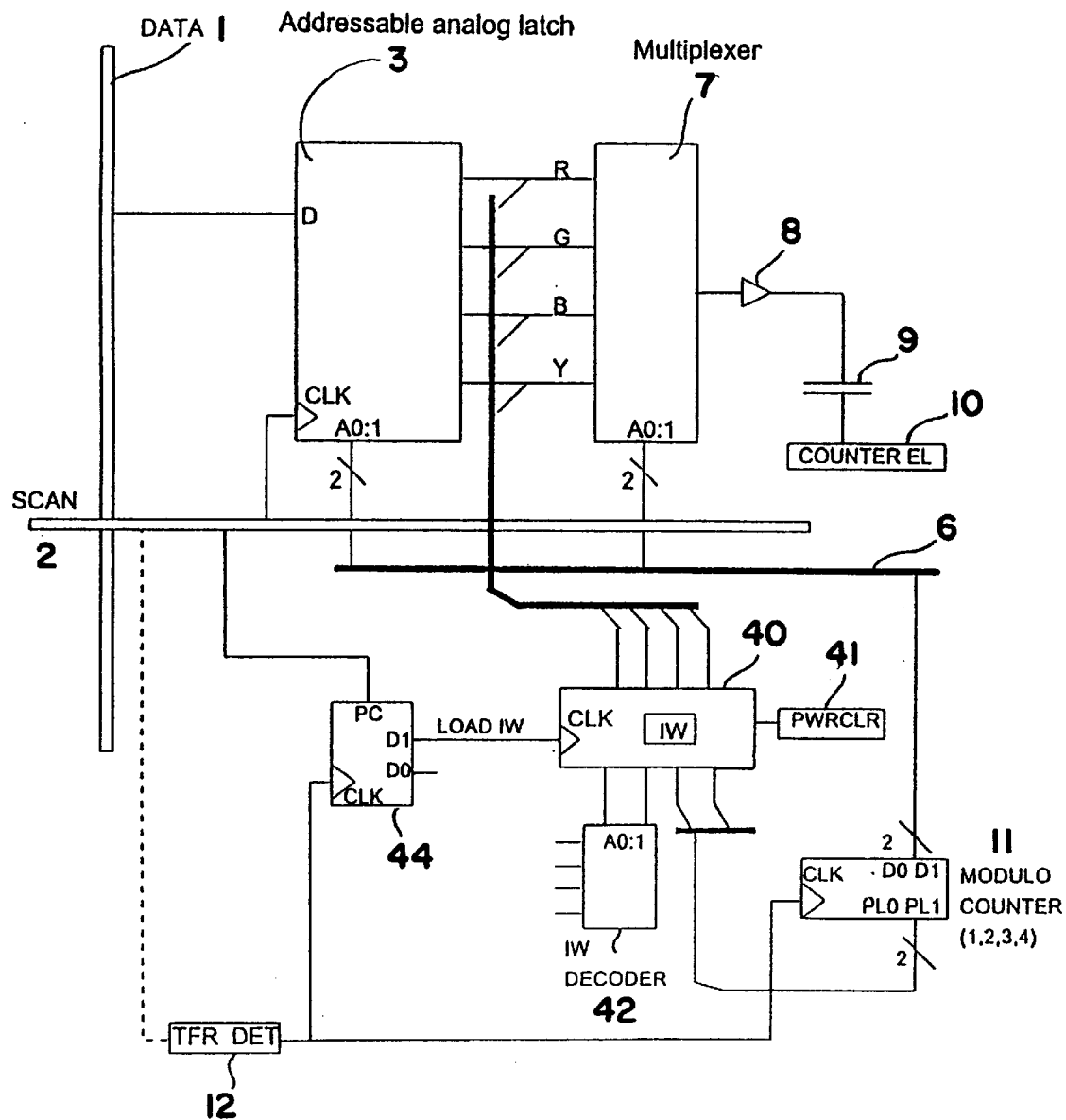
FIG. 15 is a circuit diagram of a fifth type of pixel of a display constituting an embodiment of the invention.

FIG. 15 illustrates a pixel which differs from that shown in FIG. 1 in that it may be dynamically programmed so as to perform different modes of operation without having to supply several consecutive transfer signals. For example, the pixel of FIG. 15 may be programmed to operate in the RGB mode, the RGBY mode, or the Y only (black/white) mode (which may give reduced power consumption in both the display and the backlight and which may be used in "low battery" conditions or in other circumstances). In fact, each pixel of a display whose matrix comprises pixels of the type shown in FIG. 15 may be independently programmed if required. This differs from the previously described pixels, where each line or row of pixels could be operated differently by applying the appropriate number of transfer pulses to the scan electrode. Such an arrangement may have advantages in low power modes of operation, for example in portable equipment. Different regions of the display may be programmed to operate in different modes in conjunction with an addressable backlight.

In the pixel shown in FIG. 15, the counter 11 is a programmable modulo counter and can be programmed to count to 1, 2, 3 or 4 by a two bit instruction word supplied by a latch 40. Modulo counters are well known in the art and the modulo counter is not therefore illustrated in detail. The latch 40 has four storage locations connected to respective outputs of the addressable analog latch 3 with two of the outputs of the latch 40 being connected to program inputs of the counter 11. The latch 40 has a reset input connected to a power clear circuit 41 of the same type as that illustrated in FIG. 1. The latch 40 has two further outputs connected to an instruction word decoder 42 which may therefore provide up to four other local control signals if required. However, if the other local control signals are not required, the decoder 42 may be omitted. The latch 40 has an enable or clock input connected to the second bit output of a two bit counter 44 whose clock input is connected to the output of the transfer pulse detector 12 and whose reset input is connected to the scan electrode 2.

When power is applied to the display, the power clear circuit 41 resets the counter 40, for example so that it is programmed to count modulo 4. The instruction word may be supplied to the latch 40 in an initialisation phase which may be executed at any time but which will typically be executed at least following the application of power to the display.

Each time a scan pulse is supplied to the scan electrode 2, the counter 44 is cleared and the latch 40 remains disabled. However, if two consecutive transfer pulses are received without an intervening scan pulse, the second bit output of the counter 44 goes high and enables the latch 40. This occurs after the instruction word has been written in the addressable analog latch 3 so that the instruction word is latched into the latch 40. A subsequent scan pulse resets the counter 44 so that the instruction word remains latched in the latch 40.

As described hereinbefore, the addressable analog latch 3 is used to latch analog values for providing grey scale capability. However, analog data values may be interpreted as binary values by being set fully on or fully off, for instance to the maximum possible value and the minimum possible value. The latch 40 recognises such values as binary 1 or binary 0 so that the digital instruction word can be supplied via the data electrodes 1 and the latch 3.

In order to program the pixel to operate in the Y only mode, the two digits of the instruction word supplied to the program inputs of the counter 11 set it to count modulo 1. For RGB operation, the counter 11 is set to count modulo 3. For RGBY operation, the counter 11 is set to count modulo 4.

In the same way that the digital instruction word may be represented by analog values, the pixels described hereinbefore may operate with digital image data using the analog storage mechanism.

Figure 16:
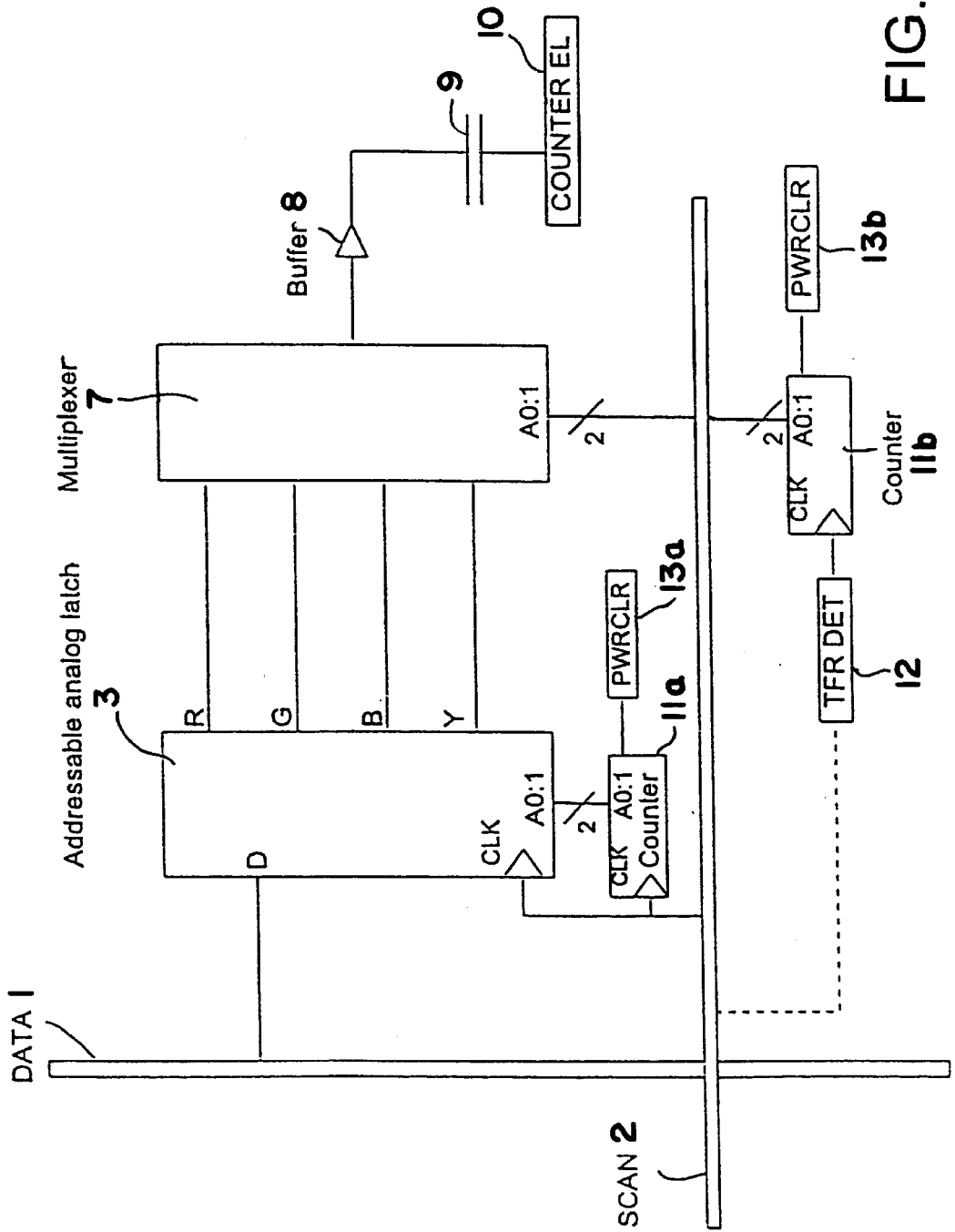
FIG. 16 is a circuit diagram of a pixel of the first type as shown in FIG. 1 modified to permit a third type of operation.

The pixel shown in FIG. 16 differs from that shown in FIG. 1 in that it is capable of a third type of operation. For this, the counter 11 is replaced by a two bit counter 11*a* whose output is connected to the address input of the latch 3 and a two bit counter 11*b* whose output is connected to the address input of the multiplexer 7. The clock input of the counter 11*a* is connected to the scan electrode 2 whereas the clock input of the counter 11*b* is connected to the transfer pulse detector 12. Both of the counters 11*a* and 11*b* are provided with power clear circuits 13*a* and 13*b* for resetting the counters when power is applied to the display. Such resetting of both counters is essential in this type of pixel to ensure that the relative phases of operation of the latch 3 and the multiplexer 7 can be determined.

Figure 17:
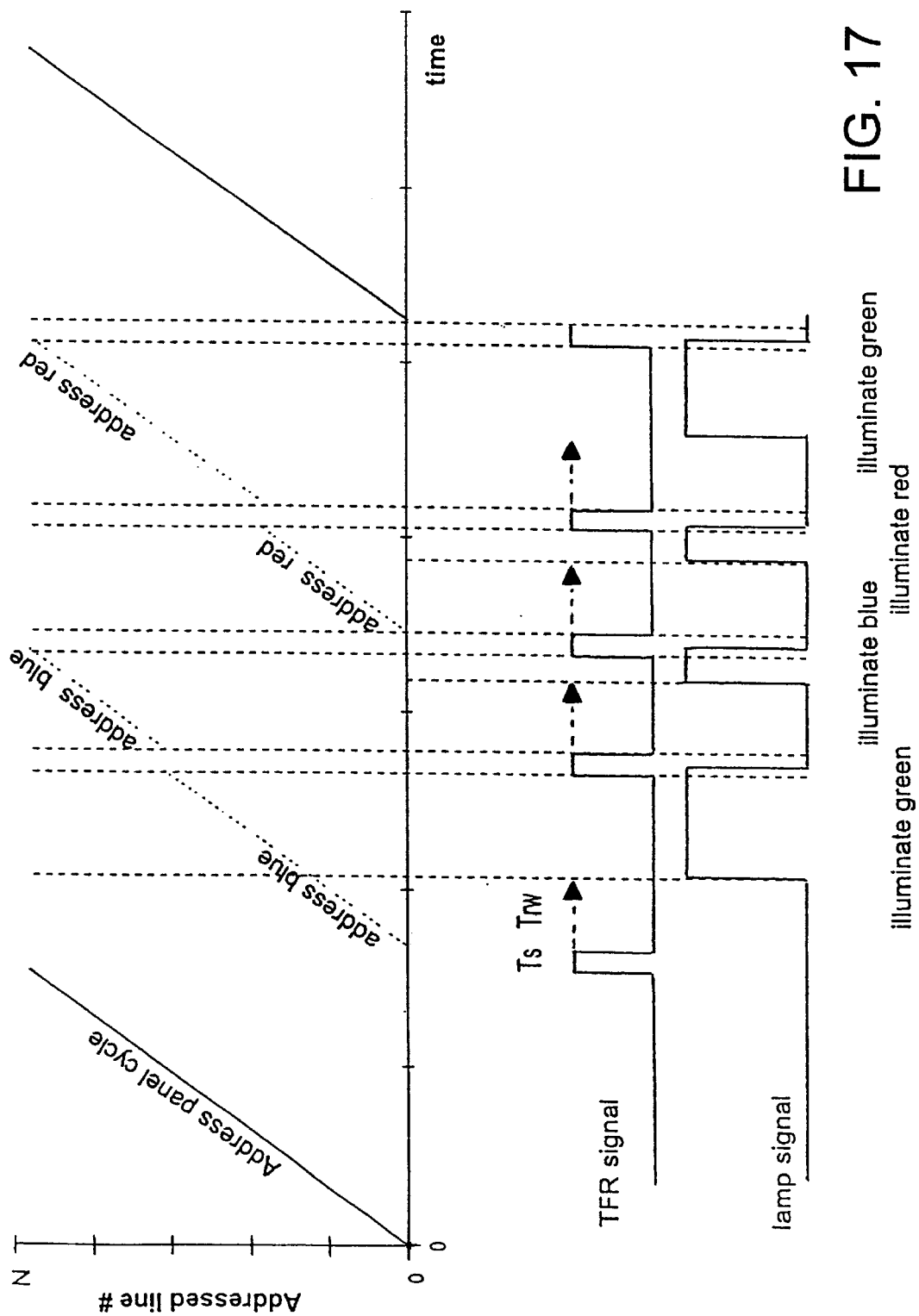
FIG. 17 is a timing diagram illustrating waveforms occurring in a display comprising pixels of the type shown in FIG. 16 during the third type of operation.

A display comprising a matrix of pixels as shown in FIG. 16 is capable of the first and second types of operation described hereinbefore but is also capable of the third type of operation. An example of this is illustrated in FIG. 17. Initially, a transfer pulse causes green image data to be supplied by the multiplexers 7 of the pixels to the display pixels 9. Immediately thereafter, a blue addressing phase begins. After a delay to allow for the response time of the liquid crystal material, green illumination is provided by the backlight. The green illumination is then extinguished and the next transfer pulse supplies blue image data to the display pixels which are then illuminated with blue light. The blue addressing phase is suspended during the presence of the transfer pulse because the transfer pulses share the scan electrodes 2 with the scan pulse. However, immediately after the transfer pulse, the blue addressing phase is continued.

As shown in FIG. 17, addressing phases and display phases may be completely unrelated in time to each other. Thus, addressing may take place at any desired rate, for instance as convenient for equipment driving the display or as dictated by the speed of operation of the driver electronics of the display. The display rate may be chosen independently, for instance to prevent undesirable visual artefacts such as flicker. Because the scan electrodes 2 carry both the scan signals and the transfer pulses, addressing has to be suspended in the presence of the transfer pulses but, otherwise, addressing and displaying are totally independent of each other.

Figure 18:
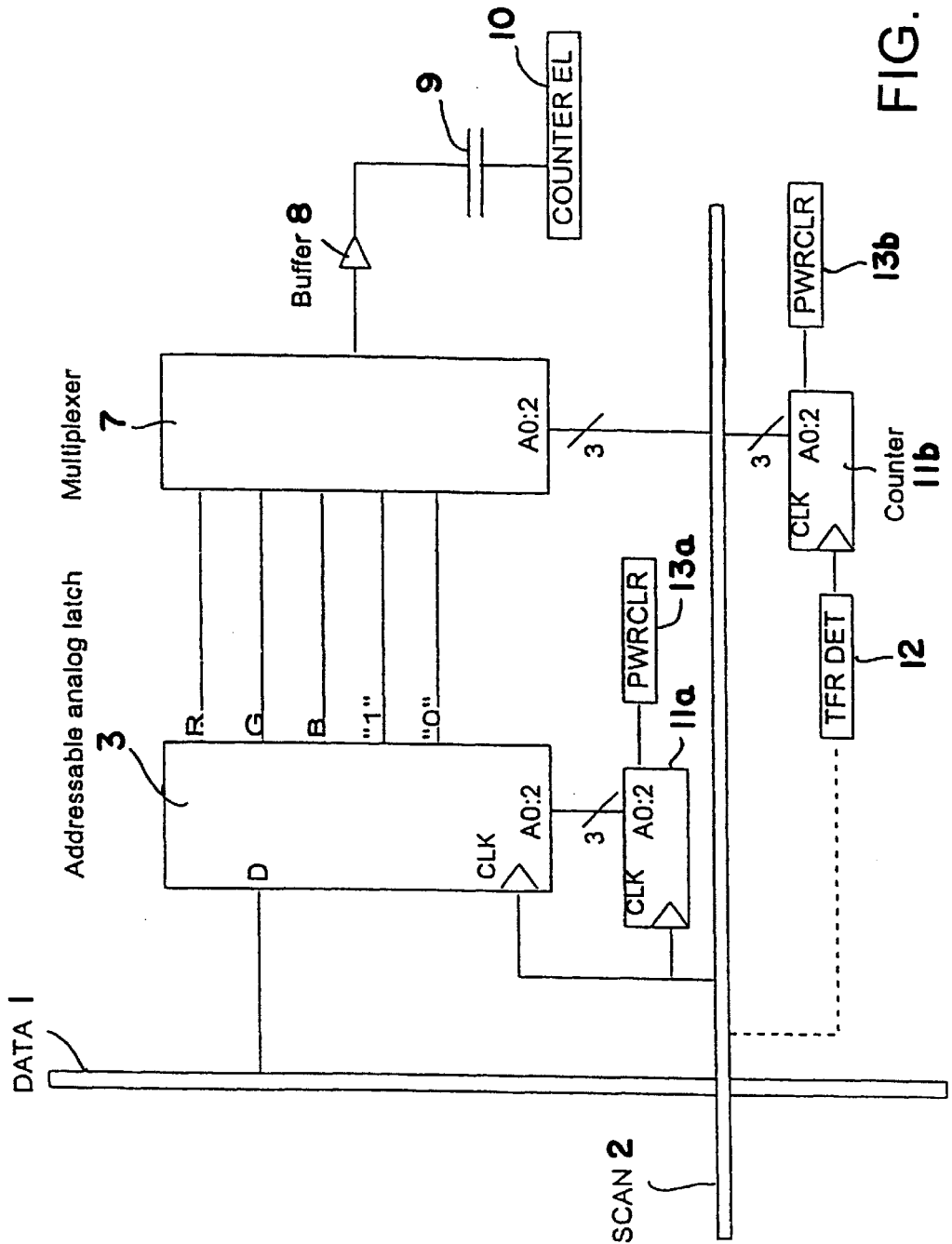
FIG. 18 is a circuit diagram of a pixel of the second type as shown in FIG. 12 modified to permit the third type of operation.
Figure 19:
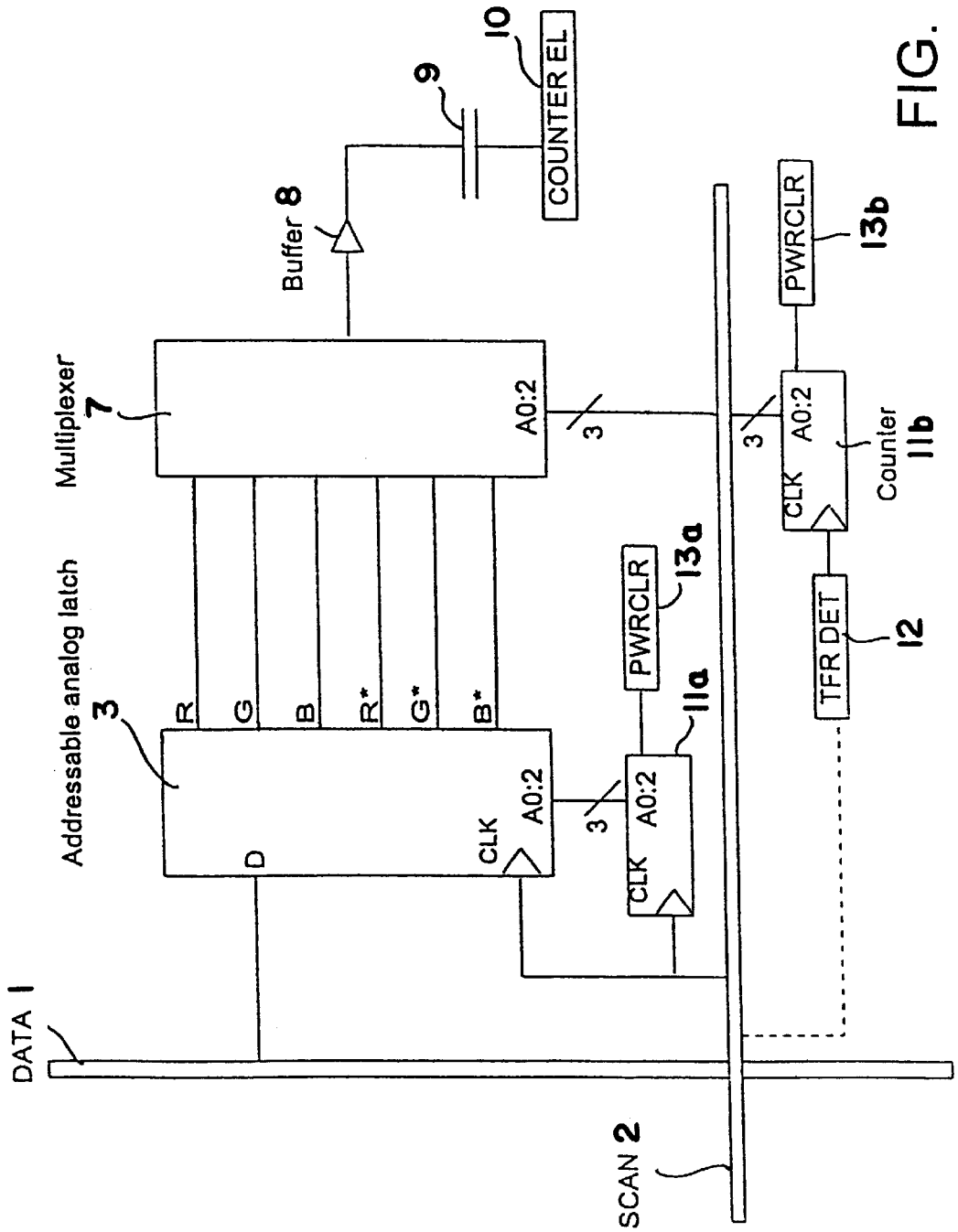
FIG. 19 is a circuit diagram of a pixel of the third type as shown in FIG. 13 modified to permit the third type of operation.
Figure 20:
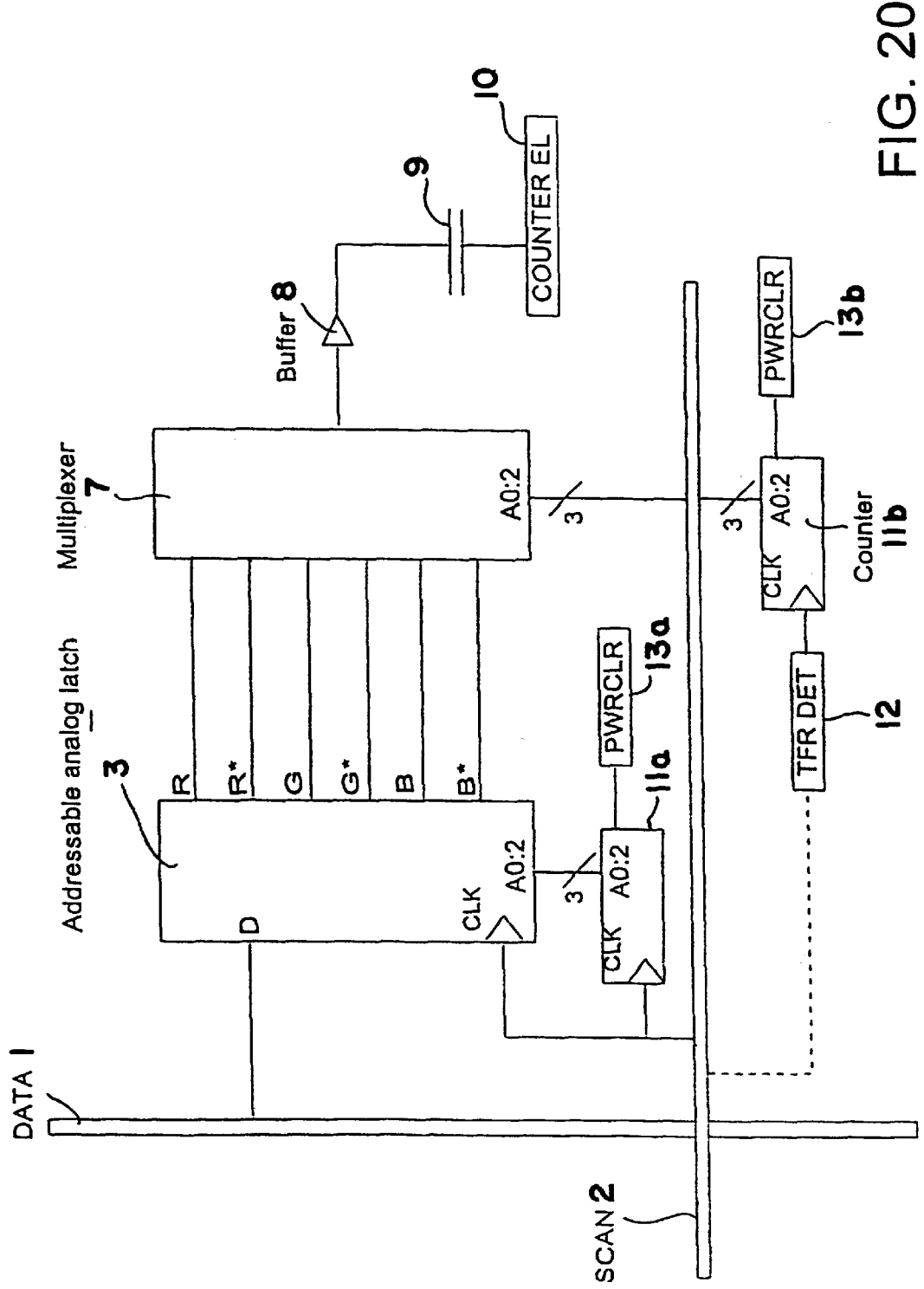
FIG. 20 is a circuit diagram of a pixel of the fourth type as shown in FIG. 14 modified to permit the third type of operation.

FIGS. 18, 19 and 20 illustrate pixels of the type shown in FIGS. 11, 13 and 14, respectively, modified in the same way to permit the third type of operation.

Figure 21:
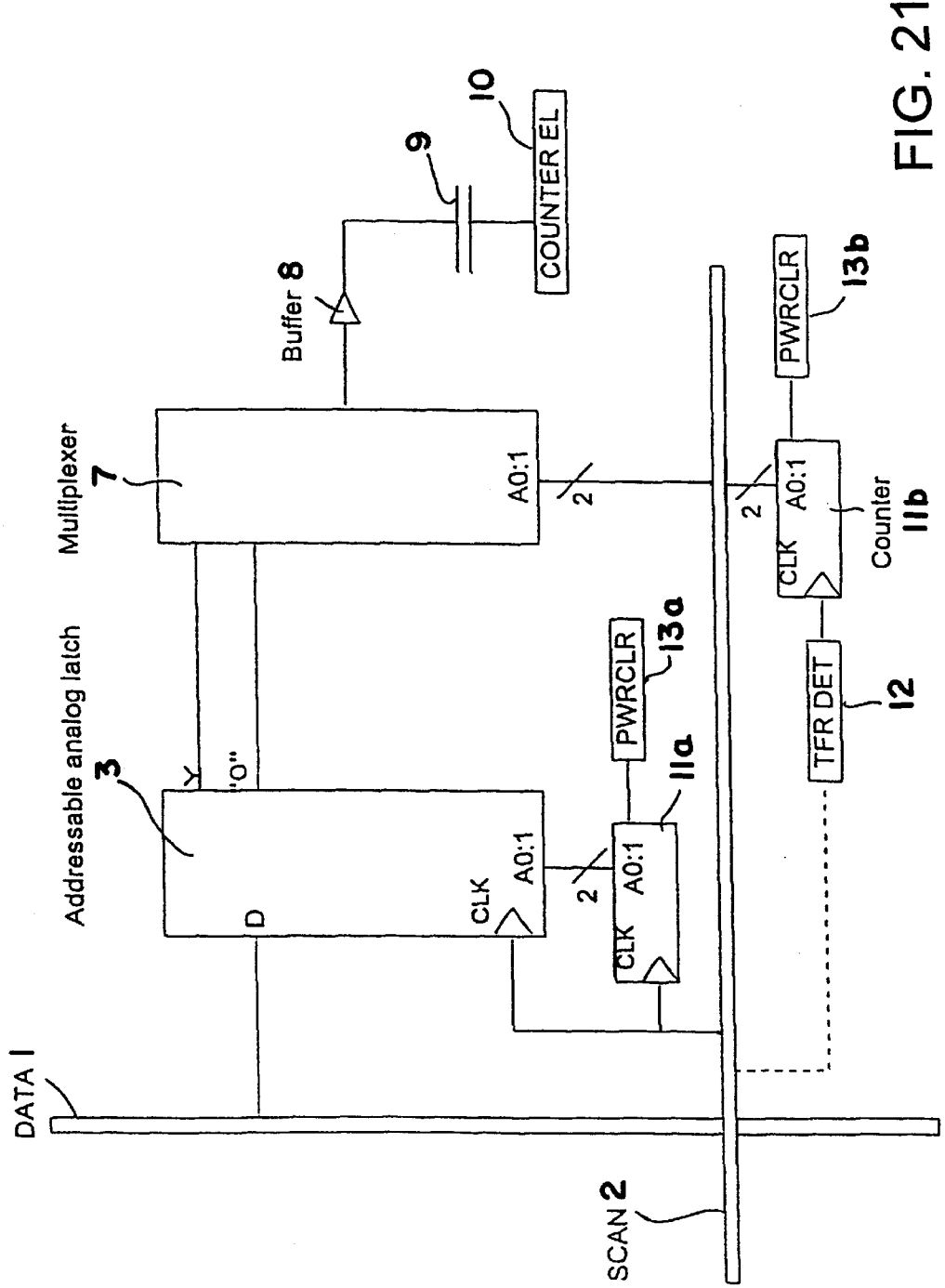
FIG. 21 is a circuit diagram of a sixth type of pixel of a display constituting an embodiment of the invention.

FIG. 21 illustrates a pixel of the type shown in FIGS. 18 to 20 but for operation with a Y field and a blanked or "0" field only. Such an arrangement may provide black and white or monochrome display with blanking as described hereinbefore with reference to FIG. 11.

Figure 22:
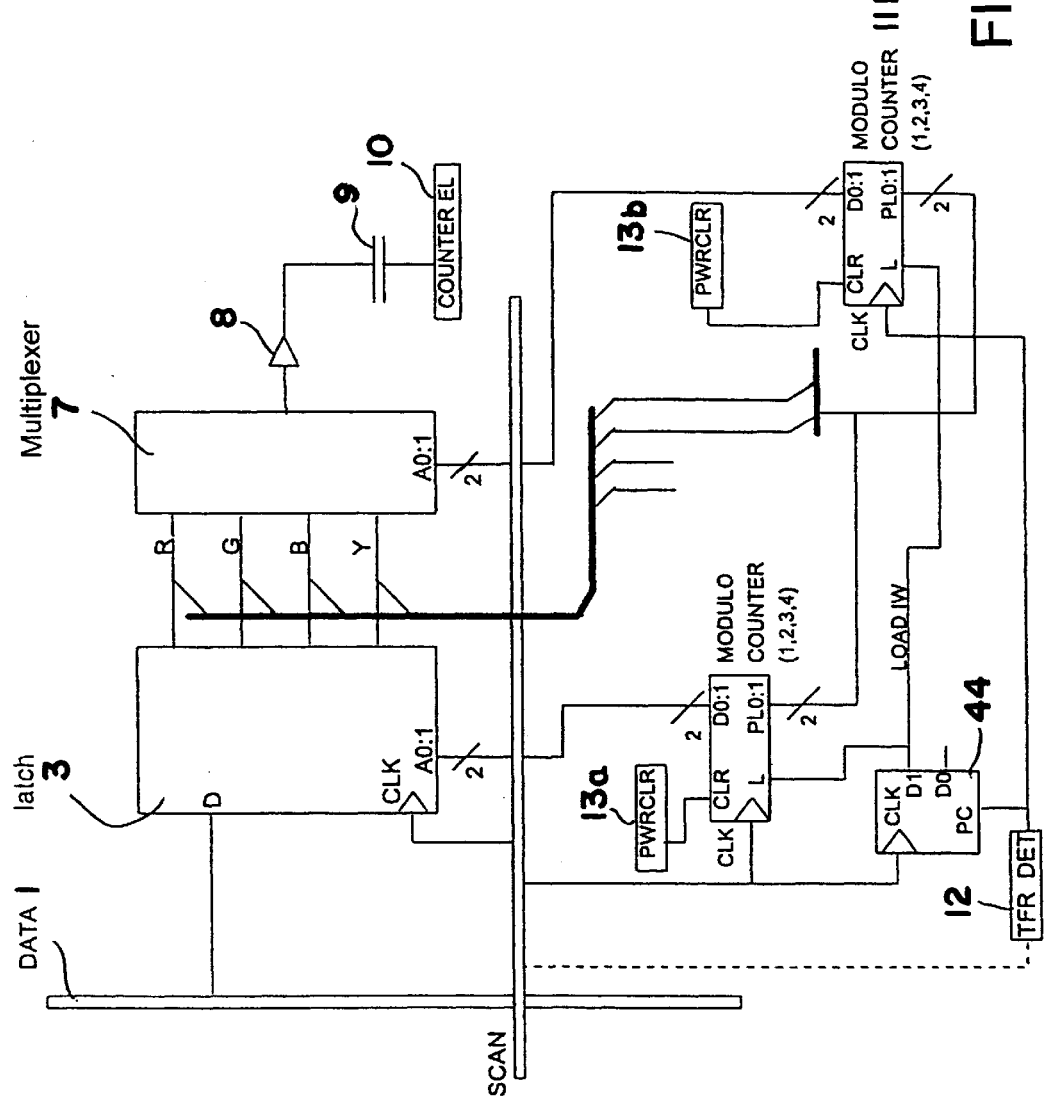
FIG. 22 is a circuit diagram of a pixel of the fifth type as shown in FIG. 15 modified to permit the third type of operation.

FIG. 22 illustrates a pixel of the type shown in FIG. 15 but again modified to permit the third type of operation. In this case, the latch 40 and its associated power clear circuit 41 have been omitted as latching is performed within the counters 11*a* and 11*b*. Instead, the outputs of the latch 3 are connected directly to the program inputs of the modulo counters 11*a* and 11*b*. The decoder 42 has also been omitted from FIG. 22, although it may be connected to the outputs of the latch 3 which are not used for programming the counters 11*a* and 11*b* provided it is arranged only to respond when an instruction word is present at the outputs of the latch 3.

Figure 23:
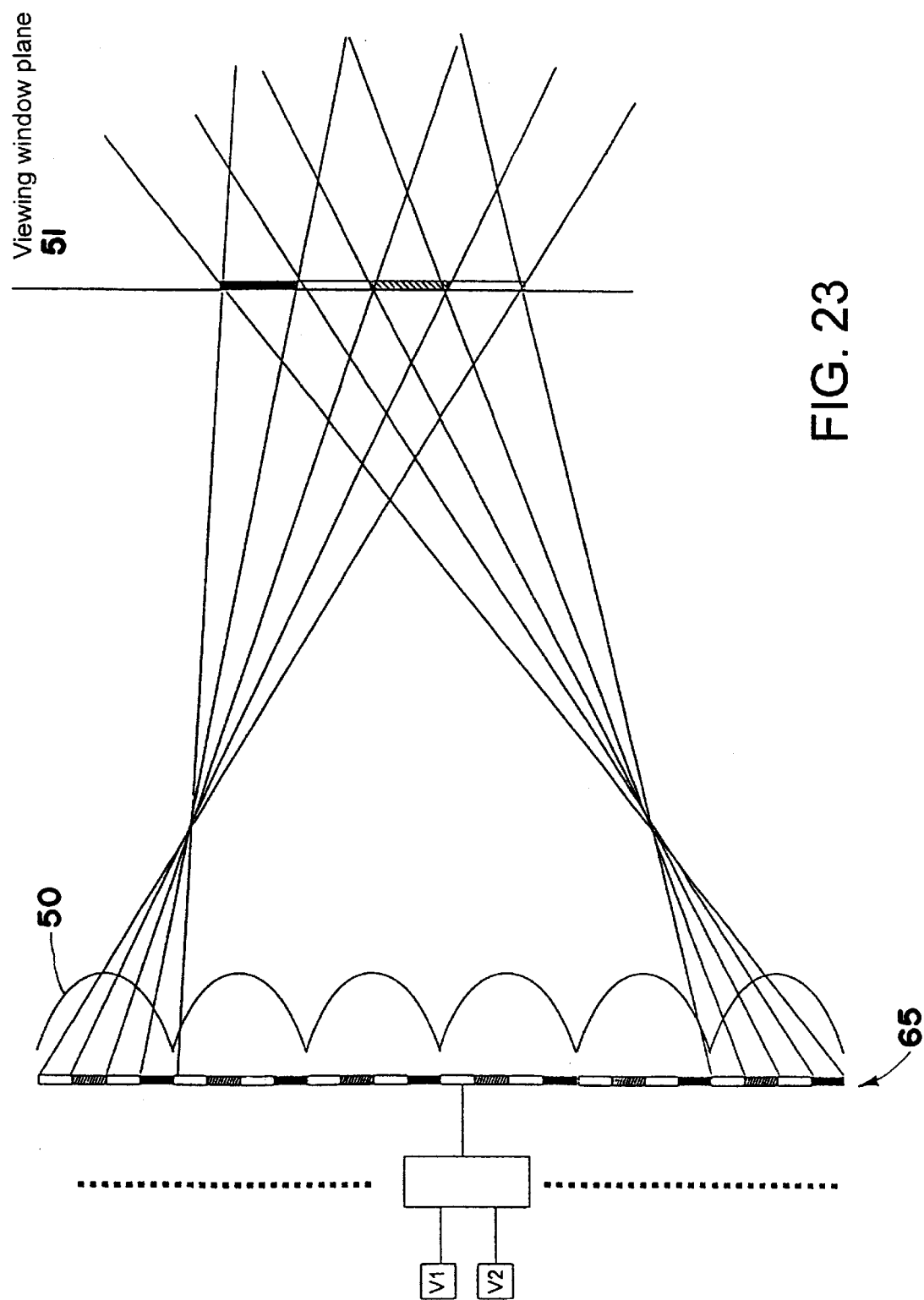
FIG. 23 illustrates diagrammatically a first type of autostereoscopic 3D display including any of the displays illustrated in FIGS. 1 to 22.

FIG. 23 illustrates the use of a display 65 of any of the types described hereinbefore as part of an autostereoscopic 3D display of the type disclosed in GB 2 297 876 and EP 0 726 482. The display 65 is associated with a parallax optic 50, which is illustrated in FIG. 23 as a lenticular screen. The 3D display is arranged to generate four viewing windows in a viewing window plane 51 at the intended viewing distance from the display. In this case, instead of sequential RGB data, the display provides sequential V1 and V2 data which contain different 2D view data of a 3D image.

Input views indicated as V1 and V2 and typically corresponding to left and right images of a 3D scene are multiplexed to each of the pixels of the display 65. The 3D display provides electronic tracking of an observer with no moving parts by switching the 2D input views and the individual pixels as appropriate so that, within the permitted range of movement, the observer sees the correct pair of views with his eyes.

A typical viewing window width is 32 mm and view switching is required when the observer has moved by half the width of a window. With observers being capable of moving at speeds of up to 1 meter per second, window switching speeds in excess of 16 milliseconds are required. If the additional latency of an observer detection system (not shown) is included, waiting to switch views on a frame boundary i.e. up to 16 milliseconds delay, is unacceptable.

Figure 24:
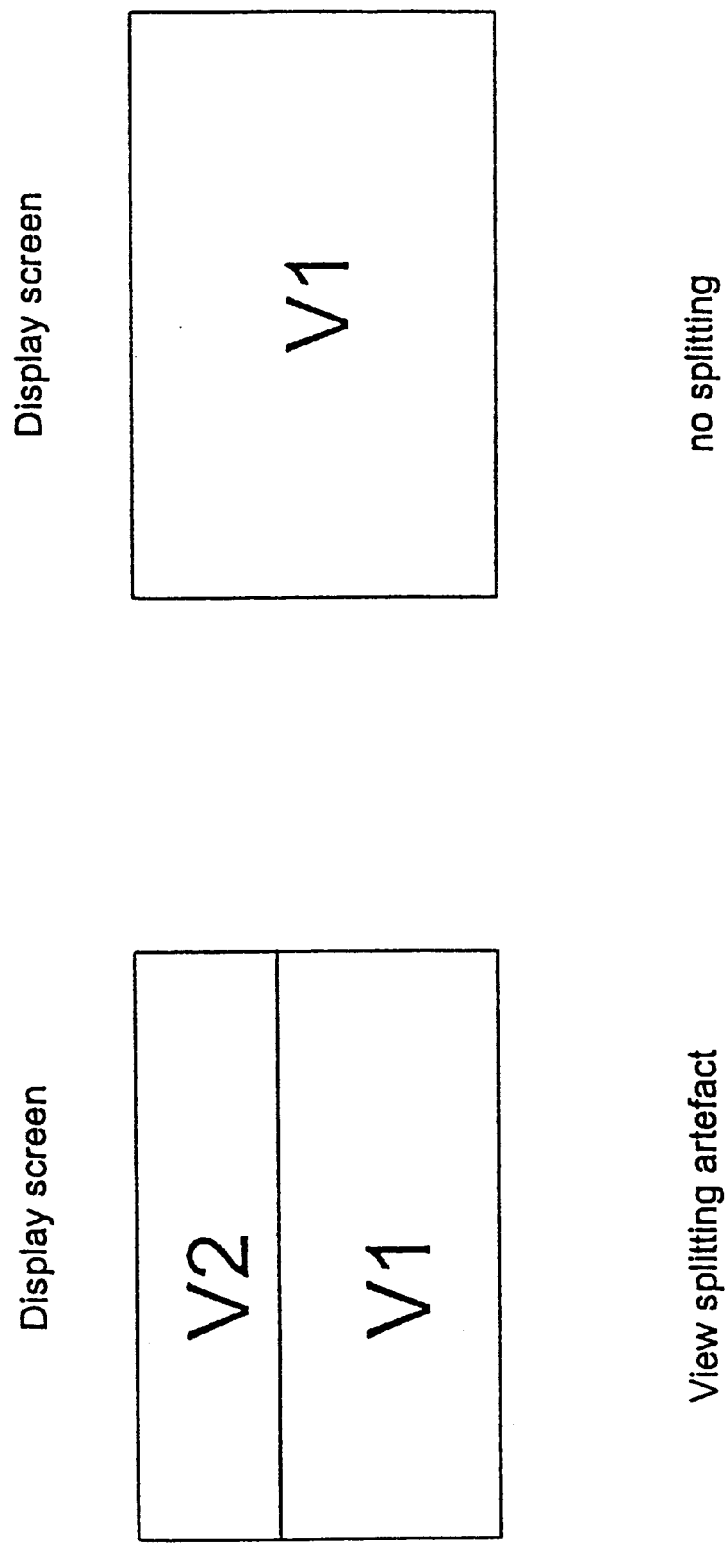
FIG. 24 illustrates a view splitting artefact which can be avoided by the 3D display of FIG. 23.

In known arrangements, this problem is overcome by switching views in the middle of a frame. This results in view splitting as illustrated in the left part of FIG. 24 where one eye of an observer briefly sees parts of both the views V1 and V2 whereas he should see only the view V1 as shown in the right hand part of FIG. 24. However, when the display 65 is of the type described hereinbefore, view information can be switched very rapidly to each pixel simultaneously for the whole display so that extra latency or view splitting artefacts can be substantially eliminated. Moreover, it is not necessary to increase the overall frame rate of the display.

Figure 25:
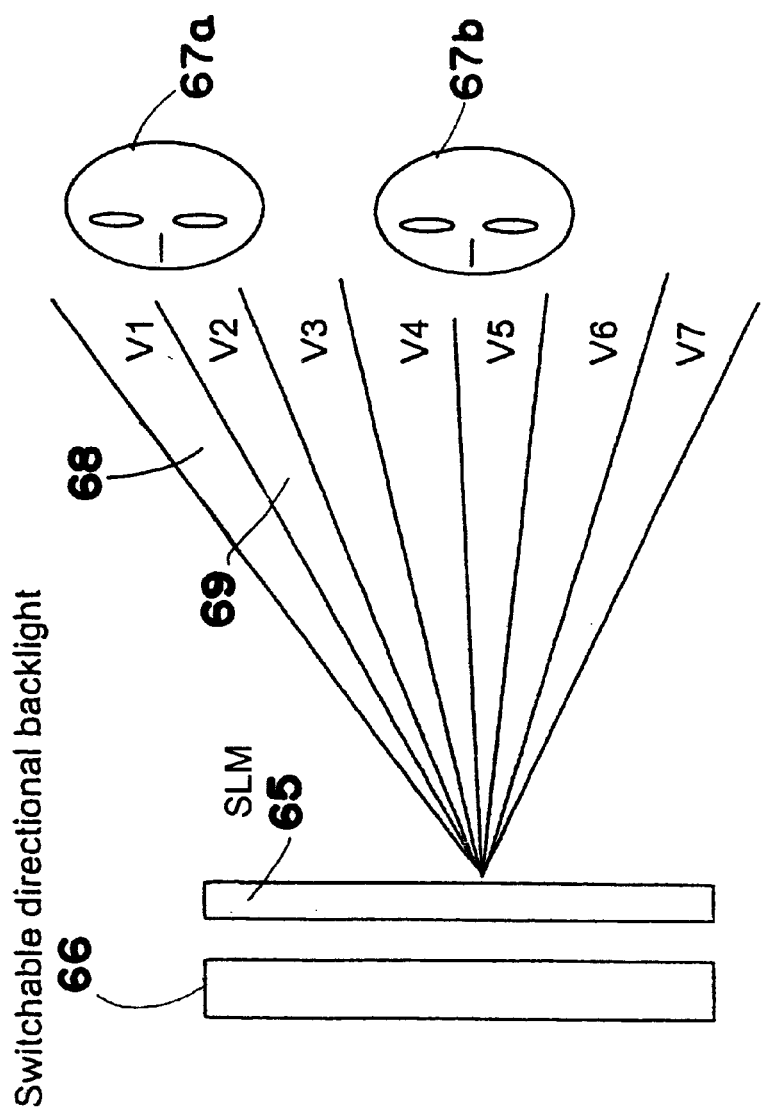
FIG. 25 illustrates diagrammatically a second type of autostereoscopic 3D display including any of the displays illustrated in FIGS. 1 to 22.

FIG. 25 illustrates an autostereoscopic display using a display or spatial light modulator (SLM) 65 as described hereinbefore. The SLM 65 cooperates with a switchable directional backlight 66 so as to permit the simultaneous viewing of several different views, indicated as V1 to V7 in the drawing, by observers such as 67*a* and 67*b*. The SLM is controlled in synchronism with the backlight 66 such that each of the views is only visible in a restricted region of space. Thus, the SLM 65 displays image data for the view V1 when the backlight 66 illuminates the SLM 65 so that the image is visible in the tapered region of space indicated at 68. The backlight 66 is then extinguished and the SLM 65 is refreshed with image data for the view V2. When the image has been transferred to the pixels of the SLM 65, the backlight 66 is again illuminated so as to direct light into the region 69. This process is repeated for each of the views in sequence sufficiently rapidly for flicker to be substantially invisible to an observer.

The views V1 to V7 of an object or scene are reproduced in the directions from which they were recorded during image capture or generated by a computer graphics system. Accordingly, the observer 67 sees the views V1 and V2 with the right and left eyes, respectively, in the way he would have seen the object or scene itself. As the observer moves laterally with respect to the display, the views which are visible to the left and right eyes change so as to maintain the 3D appearance and to provide a look-around facility.

Figure 26:
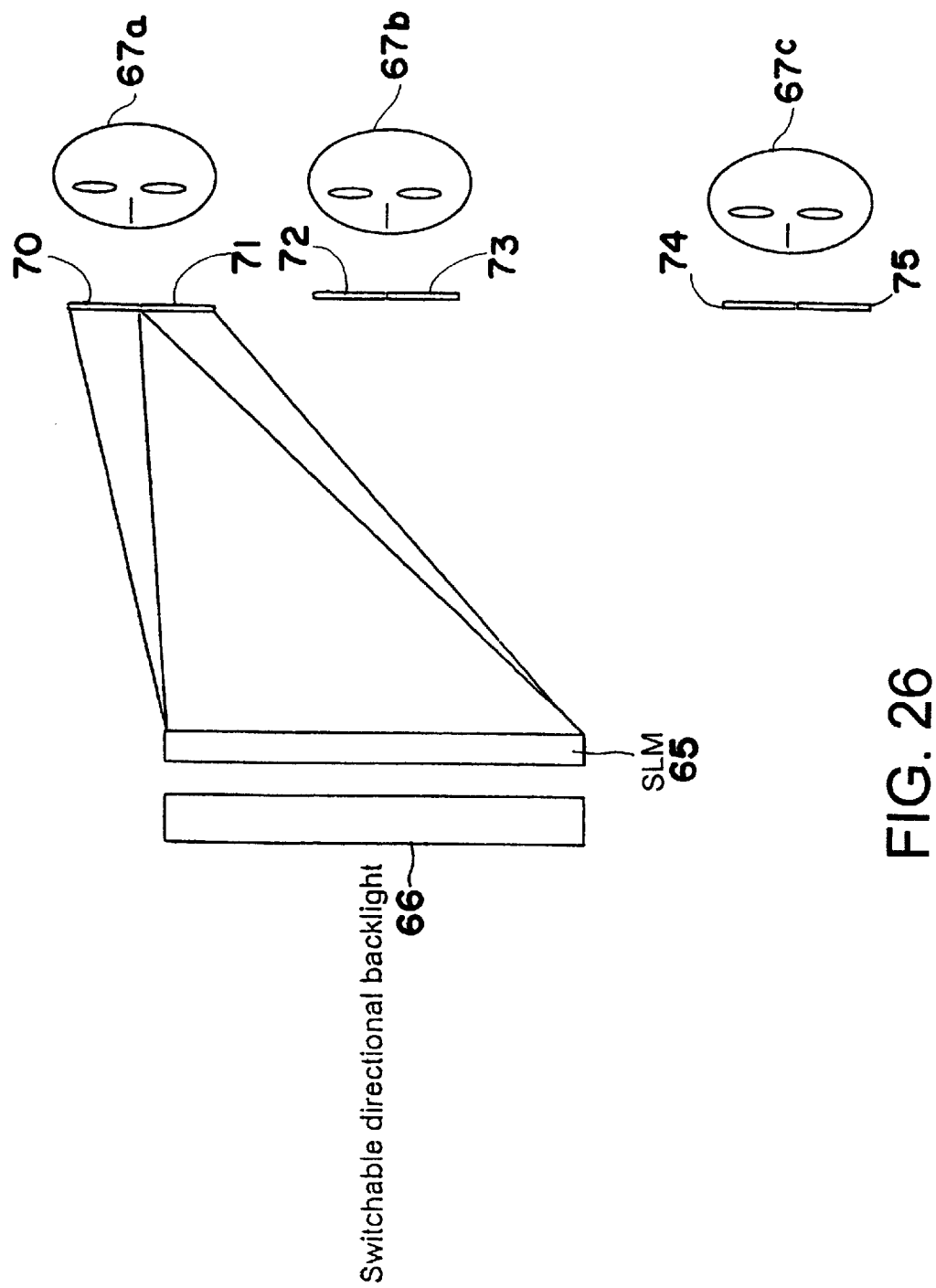
FIG. 26 illustrates diagrammatically a third type of autostereoscopic 3D display including any of the displays illustrated in FIGS. 1 to 22.

FIG. 26 illustrates another autostereoscopic 3D display of a type similar to that disclosed in EP 0 576 106 but using the SLM 65 and the switchable directional backlight 66 as shown in FIG. 25. This display is capable of supplying 3D images to several independent observers such as 67a, 67b and 67c at the same time. An observer tracking system (not shown) for determining the positions of the observers 67a, 67b, 67c controls the SLM 65 and the backlight 66 so as to form viewing windows such as 70 to 75 which independently track each of the observers. The views displayed by the SLM 65 are synchronised with the operation of the switchable directional backlight 66 so that each observer perceives a 3D image. Although the left and right eye views may be the same for each observer, the SLM 65 is capable of being refreshed sufficiently quickly for different observers to see different 3D views. For example, this may be used to provide a look-around facility in the same way as the display shown in FIG. 25. However, the display illustrated in FIG. 26 does not need to generate and display views in locations where no observer is present. Both colour and view information or either or part thereof may be multiplexed to each observer in a time sequential manner with any remaining information for each view being produced by spatial multiplexing. With this arrangement and multiple viewers, it is preferable to avoid lobe generation.

Figure 27:
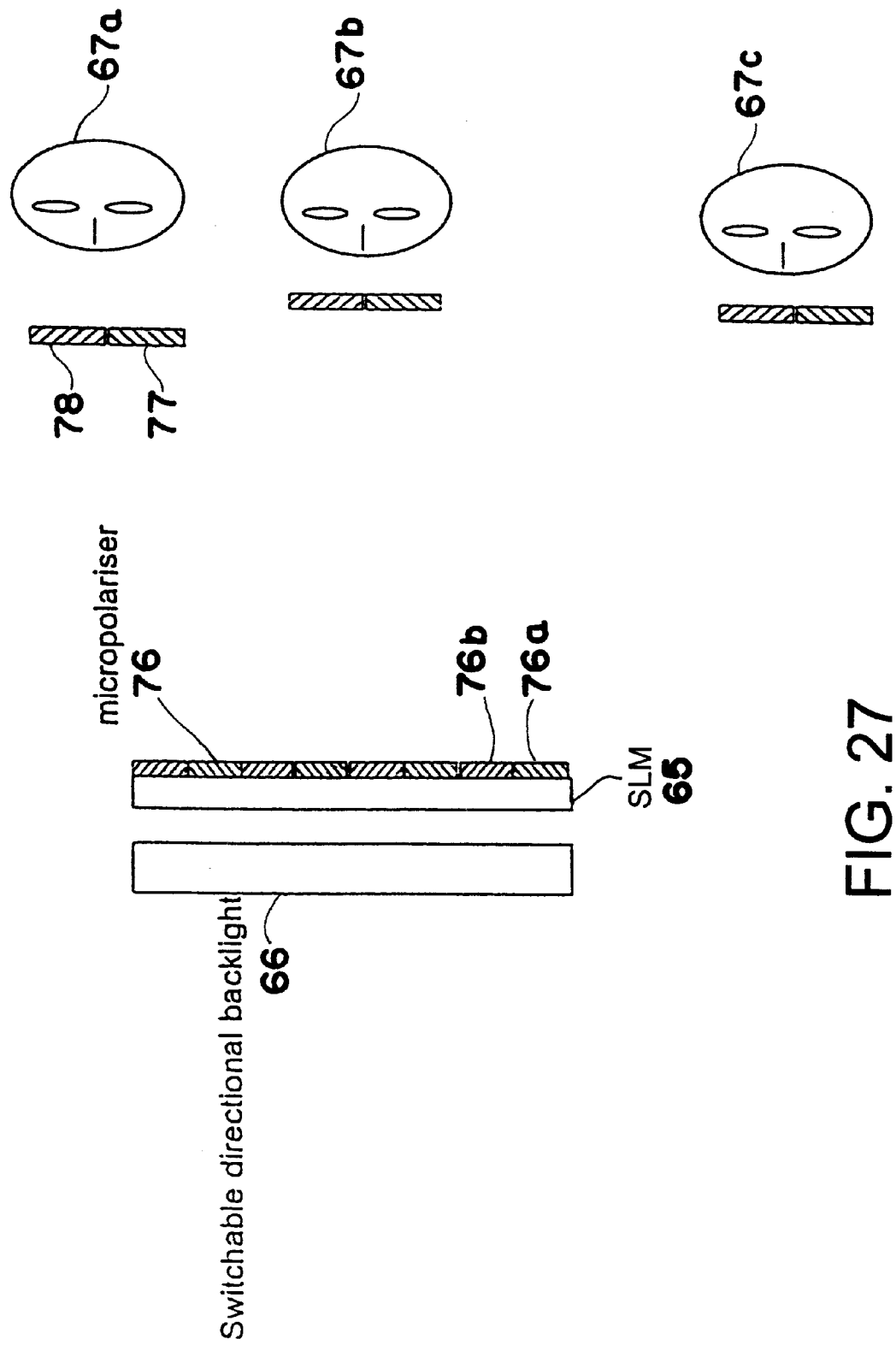
FIG. 27 illustrates diagrammatically a first type of stereoscopic 3D display including any of the displays illustrated in FIGS. 1 to 22.

FIG. 27 illustrates a stereoscopic 3D display of the micropolariser type, for example as disclosed in EP 0 721 132. The display comprises an SLM 65 and a backlight 66 of the type illustrated in FIGS. 25 and 26. However, the SLM 65 comprises an output micropolariser 76 comprising two sets of interlaced regions or elements providing orthogonal output polarisations. The pixels of the SLM 65 display pairs of stereoscopic 3D images in a spatially multiplexed way such that light from the pixels displaying the left eye image pass through polarising elements 76a whereas light from pixels displaying the right eye image pass through polarising elements 76b. The elements 76a and 76b may be linear polarisers or circular polarisers but provide orthogonal output polarisations.

In order to view the stereoscopic images correctly, the observers are provided with polarising glasses comprising a left eye polariser such as 77 and a right eye polariser 78. The polariser 77 transmits light from the elements 76a and blocks light from the elements 76b of the micropolariser 76 whereas the polariser 78 transmits light from the elements 76b but blocks light from the elements 76a. The left and right eyes of each observer therefore see only the left and right eye images, respectively, displayed by the SLM 65.

The display shown in FIG. 27 may be operated in substantially the same way as that shown in FIG. 26, namely to provide independent viewing information for each of the observers 67a, 67b and 67c. However, whereas the individual eye views for the observers are provided time-sequentially by the display of FIG. 26, the left and right eye views for each observer are provided simultaneously by spatial multiplexing in the display of FIG. 27. The pairs of images for the individual observers are provided time-sequentially in the display of FIG. 27. Thus, by utilising the spatial resolution of the SLM 65 in the display of FIG. 27, the addressing rate requirement of the SLM 65 may be reduced.

Figure 29:
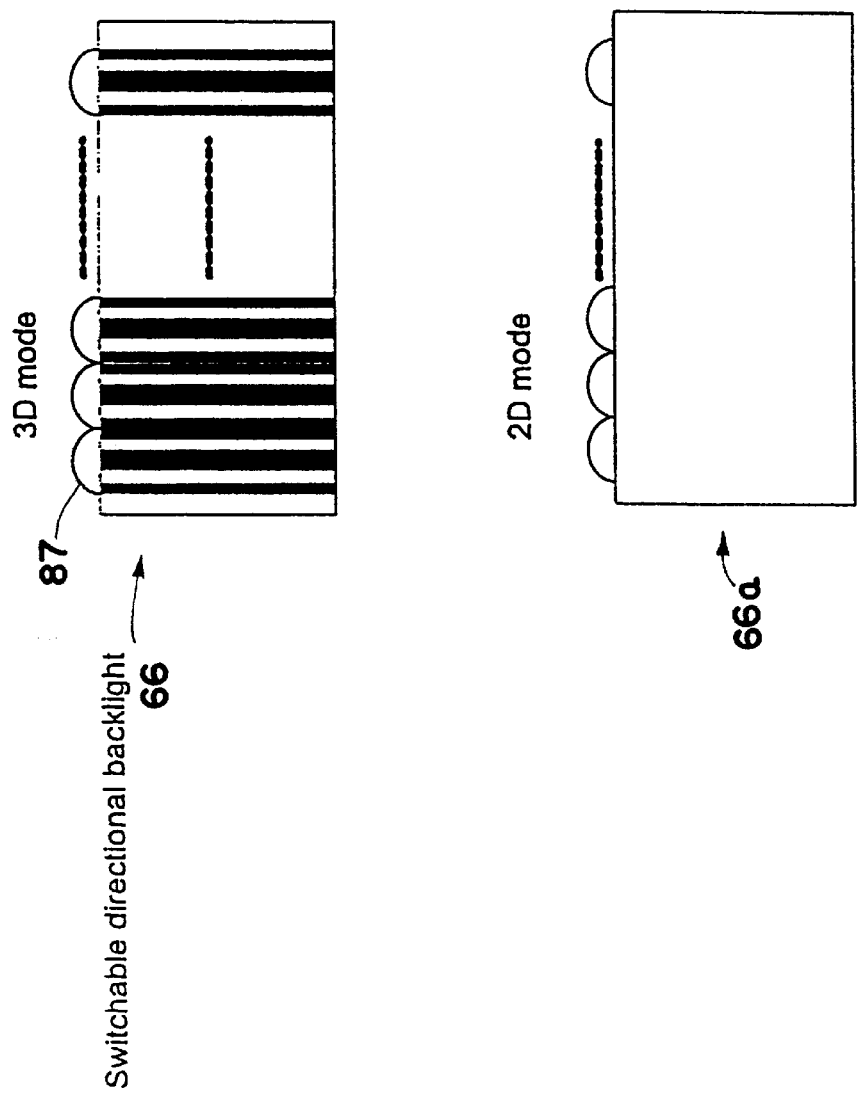
FIG. 29 illustrates diagrammatically an example of a switchable directional backlight suitable for the 3D displays of FIGS. 26 and 27.

FIG. 29 illustrates diagrammatically a compact directional backlight which may be used as the backlight 66 in the displays shown in FIGS. 25 to 27. The backlight 66 may be of the type disclosed in GB 2 317 710 and EP 0 833 183 and/or EP 0 656 555. The upper part of the drawing illustrates a 3D mode of operation. The backlight comprises a plurality of imaging elements in the form of a lenticular screen 87 cooperating with a light source in the form of a plurality of parallel strip emitting regions. The lateral positions of the strip emitting regions are controllable relative to the lenticular screen 87 so as to control the output direction of the backlight 66. For example, the strip emitting regions may be defined by a plurality of moveable slits cooperating with a compact extended rear light source. The slits may be provided by a spatial light modulator of the liquid crystal type so as to provide a switchable directional backlight without moving parts.

A 2D mode of the backlight is illustrated at 66a in FIG. 29. In this mode, a non-directional or diffused backlight is required and this may be achieved by removing or disabling the strip light sources. Where these are provided by a liquid crystal SLM, the SLM may be controlled so as to be transparent to permit the transmission of light across the whole of its area.

Figure 28:
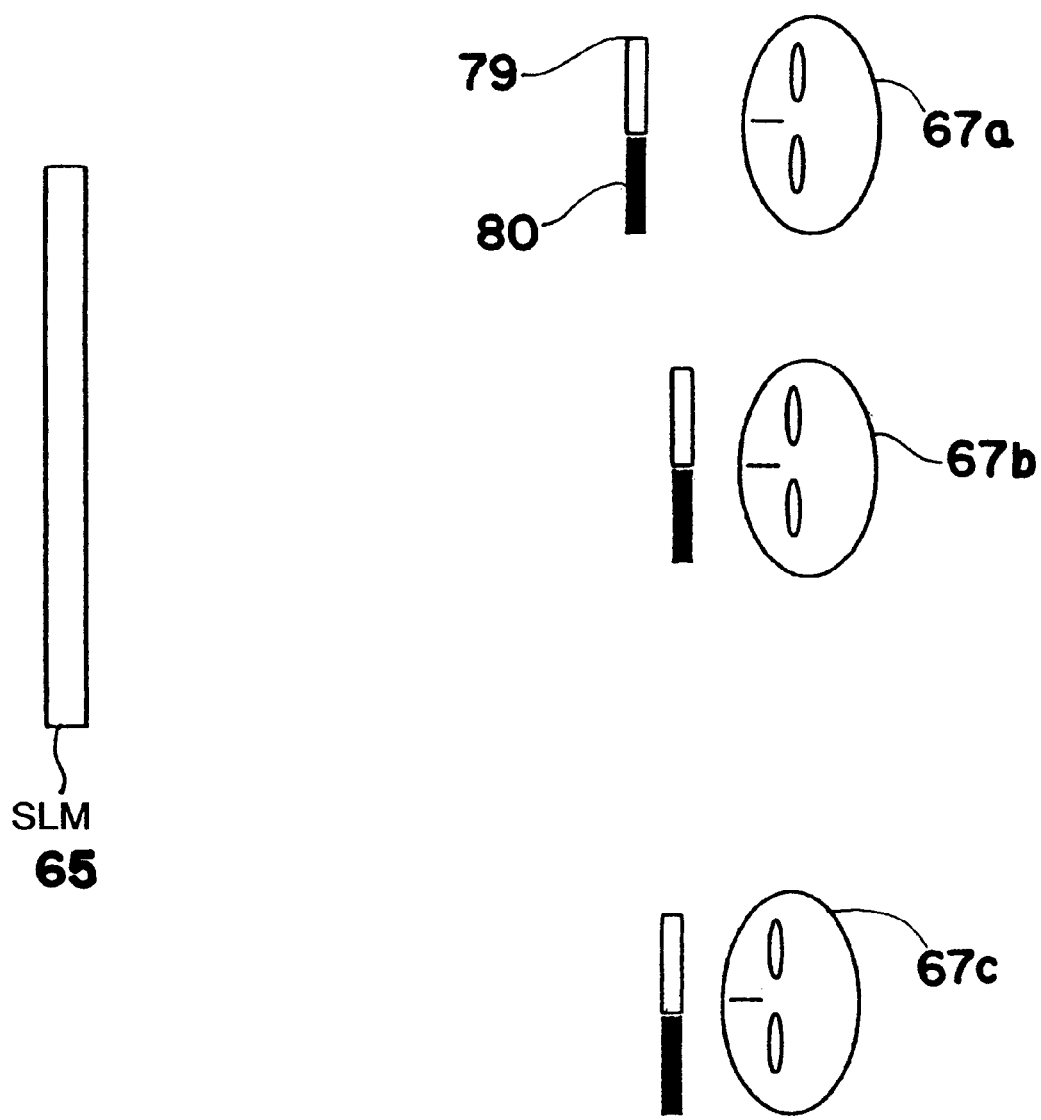
FIG. 28 illustrates diagrammatically a second type of stereoscopic 3D display including any of the displays illustrated in FIGS. 1 to 22.

FIG. 28 shows a 3D stereoscopic display of the "shutter glasses" type. The display comprises an SLM 65 provided with a non-directional backlight (not shown). Each observer is provided with a pair of shutter glasses comprising left and right eye shutters such as 80 and 79, respectively. The SLM 65 displays the views for each eye of each observer time sequentially and the shutters 79 and 80 are opened in synchronism with the display by the SLM 65 of the view intended for the corresponding eye of the respective observer. By correct phasing of the display and the shutters of each independent observer, such an arrangement allows independent observers to see different views, for instance so as to provide a look-around facility. However, the display may be operated so that all of the observers see the same information, in which case the operation of the left and right eye shutters of the observer glasses are synchronised and the SLM 65 provides single left and right views in a time-sequential manner.

Figure 31:
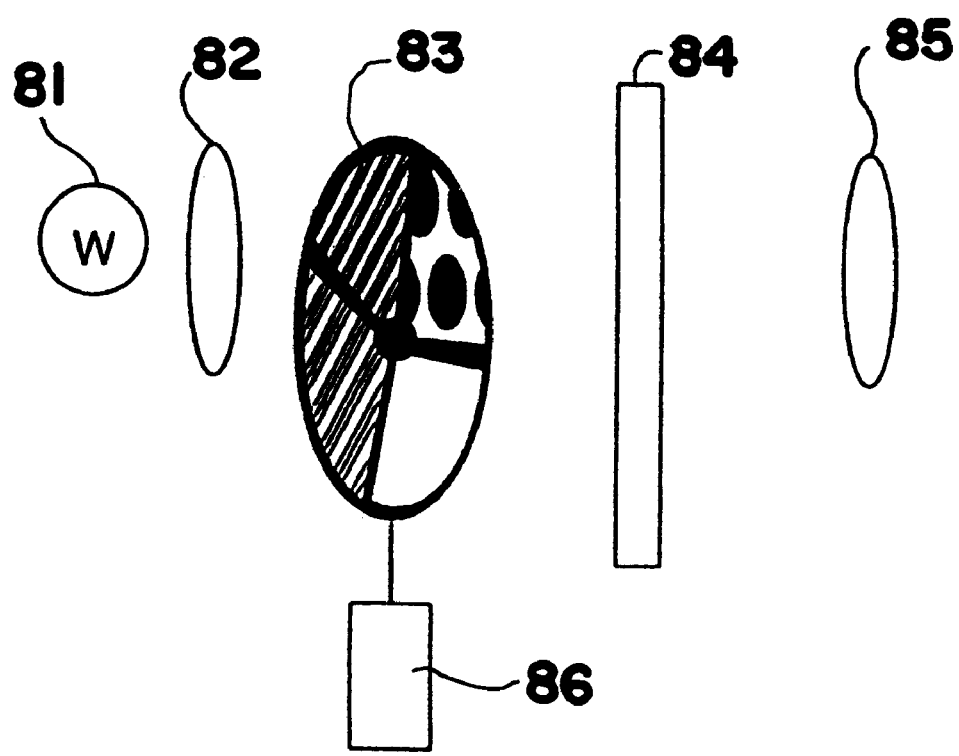
FIG. 31 illustrates diagrammatically a filter wheel type colour sequential display including any of the displays illustrates in FIGS. 1 to 22.

In the case of colour sequential displays, the multi-colour backlight may be of the filter wheel type as illustrated diagrammatically in FIG. 31. A light source 81 providing light of more than one colour band, preferably white light, is provided with a system 82 for collimation, optional harmonisation and/or polarisation conversion. Light passes through a colour filter wheel 83 which typically comprises radial sections of different colour filter bands. The wheel 83 is rotated by a suitable system 86 and is appropriately synchronised with the image display. A spatial light modulator of the type described hereinbefore is shown at 84 and a projection optical system is shown schematically at 85.

Figure 30:
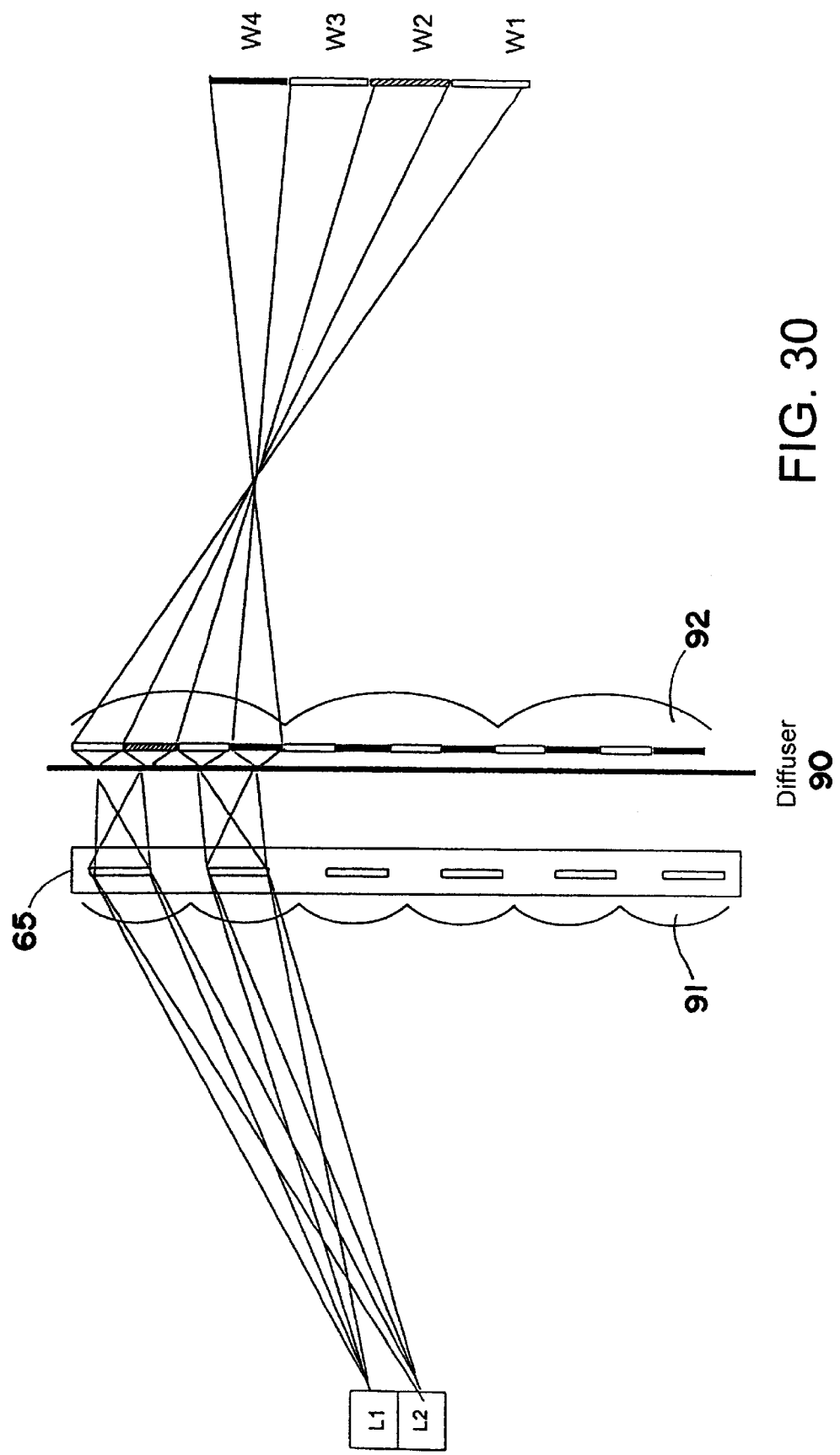
FIG. 30 illustrates diagrammatically a fourth type of autostereoscopic 3D display including any of the displays illustrated in FIGS. 1 to 22.

FIG. 30 illustrates another autostereoscopic 3D display of the hybrid type, for example as disclosed in EP 0 570 179.

Again, the SLM 65 as described hereinbefore is used in combination with a diffuser 90 and parallax optics shown as lenticular screens 91 and 92. The display is illuminated alternately by switchable light sources L1 and L2 such that, when the light source L1 is illuminated, viewing windows W1 and W3 are created whereas, when the light source L2 is illuminated, viewing windows W2 and W4 are created.

This type of 3D display provides the four viewing windows by a mixture of spatial and temporal multiplexing. By using the SLM 65 as described hereinbefore, view splitting artefacts which may arise from the relatively slow addressing time of conventional displays may be substantially avoided.

What is claimed is:

1. A time sequentially scanned display comprising a matrix of picture elements, each of which comprises a display element, an addressable latch having a plurality of storage locations and a first address input for selecting any one of the storage locations for storing image data, and a multiplexer for supplying image data from any one of the storage locations at a time to the display element, the multiplexer having a second address input for selecting which of the storage locations supplies image data to the display element,
wherein the addressable latch comprises a demultiplexer and a latch, the demultiplexer for supplying image data to the latch.

2. A display according to claim 1, in which each of the picture elements comprises an addressing arrangement for supplying addresses to the first and second address inputs.

3. A display according to claim 2, in which each of the addressing arrangements comprises a counter whose output is connected to the first and second addressing inputs so that the storage locations are selected for storing image data in a first predetermined sequence and for supplying image data to the display element in a second predetermined sequence which is identical to but one step out of phase with the first predetermined sequence.

4. A display according to claim 3, in which the counter has a clock input connected to the output of a transfer signal detector whose input is connected to a scan or data electrode of the matrix.

5. A display according to claim 3, in which the counter is a modulo counter having a modulo control input provided with a latching arrangement.

6. A display according to claim 5, in which the latching arrangement has data inputs connected to at least some outputs of the storage locations.

7. A display according to claim 6, in which the latching arrangement is arranged to be enabled by an output of a decoder.

8. A display according to claim 7, in which the counter has a clock input connected to the output of a transfer signal detector whose input is connected to a scan or data electrode of the matrix,
in which the decoder comprises a counter having a clock input connected to the output of the transfer signal detector and a reset input connected to a or the scan electrode.

9. A display according to claim 2, in which each of the addressing arrangements comprises first and second counters whose outputs are connected to the first and second address inputs, respectively.

10. A display according to claim 9, in which the first counter has a clock input connected to a scan electrode of the matrix.

11. A display according to claim 10, in which the first and second counters are modulo counters having modulo control inputs provided with a latching arrangement.

12. A display according to claim 9, in which the second counter has a clock input connected to the output of a transfer signal detector whose input is connected to a scan electrode or a data electrode of the matrix.

13. A display according to claim 12, in which the first and second counters are modulo counters having modulo control inputs provided with a latching arrangement.

14. A display according to claim 9, in which the addressing arrangement comprises a reset arrangement for resetting the first and second counters when power is applied to the display.

15. A display according to claim 9, in which the first and second counters are modulo counters having modulo control inputs provided with a latching arrangement.

16. A display according to claim 15, in which the latching arrangement has data inputs connected to at least some outputs of the storage locations.

17. A display according to claim 16, in which the latching arrangement is arranged to be enabled by an output of a decoder.

18. A display according to claim 17, in which the second counter has a clock input connected to the output of a transfer signal detector whose input is connected to a or the scan electrode or a data electrode of the matrix,
in which the decoder comprises a counter having a reset input connected to the output of the transfer signal detector and a clock input connected to a scan electrode.

19. A display according to claim 1, in which each addressable latch comprises an analog addressable latch.

20. A display according to claim 1, in which each addressable latch comprises a latch having the plurality of storage locations and a demultiplexer for selectively supplying the image data to any one of the storage locations.

21. A display according to claim 1, in which each addressable latch has a clock input connected to a scan electrode and a data input connected to a data electrode.

22. A display according to claim 1, in which each addressable latch has storage locations for red, green and blue image data.

23. A display according to claim 1, in which each addressable latch has storage locations for red, green, blue and intensity image data.

24. A display according to claim 1, in which each addressable latch has storage locations for red, green and blue image data for two image fields or frames.

25. A display according to claim 1, in which each addressable latch has storage locations for red, green, blue, white and/or black image data.

26. A display according to claim 25, in which the storage locations for the white and/or black image data are hardwired to receive voltage levels which are not addressable.

27. A display according to claim 1, comprising a multicolour backlight and a backlight controller.

28. A display according to claim 1, in which each display element comprises a liquid crystal picture element.

29. A display according to claim 28, in which each display element is of reflective type.

30. A display according to claim 29, in which the addressable latches and the multiplexers are embodied as crystalline silicon or poly-silicon.

31. A display according to claim 29, in which the addressable latches and the multiplexers are disposed behind the reflective display elements.

32. A method of operating a display according to claim 1, comprising supplying image data to the picture elements in first sets of time-sequential addressing phases with each first set constituting a frame of image data and displaying the image data in second sets of time-sequential display phases with each second set constituting a frame of image data, the number of display phases in each of the second sets being greater than or equal to the number of addressing phases in each of the first sets.

33. A method according to claim 32, in which the addressing phases of each of the first sets comprise different component colour addressing phases, the display phases of each of the second sets comprise component colour display phases, and at least one component colour display phase is repeated in each of the second sets.

34. A method according to claim 33, in which a green display phase is repeated in each of the second sets.

35. A method according to claim 33, in which the image data supplied during at least some of the addressing phases comprises or contains control data for controlling an aspect of pixel operation.

36. A method according to claim 32, in which the number of display phases in each of the second sets is an integer multiple of the number of addressing phases in each of the first sets.

37. A method according to claim 36, in which the addressing phases of each of the first sets comprise different component colour addressing phases, the display phases of each of the second sets comprise component colour display phases, and at least one component colour display phase is repeated in each of the second sets,
in which all of the colour component display phases are repeated the same number of times in each of the second sets.

38. A method according to claims 32, in which each addressable latch has storage locations for red, green, blue, white and/or black image data,
in which white and/or black addressing phases occur in only some of the first sets.

39. A method according to any one of claims 32, in which each display element comprises a liquid crystal picture element,
in which the maximum electro-optic response time of the liquid crystal picture elements is substantially equal to or less than the duration of each of the display phases.

40. A method according to claim 39, in which the image data supplied during at least some of the addressing phases comprises or contains control data for controlling an aspect of pixel operation.

41. A method according to claim 40, in which the counter is a modulo counter having a modulo control input provided with a latching arrangement,
in which the aspect of pixel operation comprises the modulo of each modulo counter.

42. A method according to claim 40, in which the first and second counters are modulo counters having modulo control inputs provided with a latching arrangement,
in which the aspect of pixel operation comprises the modulo of each modulo counter.

43. A method according to claim 32, in which the image data supplied during at least some of the addressing phases comprises or contains control data for controlling an aspect of pixel operation.

44. A method according to claim 43, in which the counter is a modulo counter having a modulo control input provided with a latching arrangement,
in which the aspect of pixel operation comprises the modulo of each modulo counter.

45. A method according to claim 43, in which the first and second counters are modulo counters having modulo control inputs provided with a latching arrangement,
in which the aspect of pixel operation comprises the modulo of each modulo counter.

* * * * *